US008624209B1

(12) United States Patent
Rafac et al.

(10) Patent No.: US 8,624,209 B1
(45) Date of Patent: Jan. 7, 2014

(54) CONTROLLING SPATIAL PROPERTIES IN AN EXCIMER RING AMPLIFIER

(71) Applicant: Cymer, Inc., San Diego, CA (US)

(72) Inventors: Robert Jay Rafac, Encinitas, CA (US); Dershen Wan, San Diego, CA (US); Eric Mason, Escondido, CA (US); Rostislav Rokitski, La Jolla, CA (US)

(73) Assignee: Cymer, LLC, San Diego, CA (US)

( * ) Notice: Subject to any disclaimer, the term of this patent is extended or adjusted under 35 U.S.C. 154(b) by 0 days.

(21) Appl. No.: 13/830,905

(22) Filed: Mar. 14, 2013

(51) Int. Cl.
*H01S 3/22* (2006.01)
*H01S 3/08* (2006.01)

(52) U.S. Cl.
USPC ........ 250/504 R; 250/492.1; 372/25; 372/55; 372/57; 372/95; 372/108

(58) Field of Classification Search
USPC ......... 250/504 R, 372, 492.1; 372/25, 55, 57, 372/95, 94, 108
See application file for complete search history.

(56) References Cited

U.S. PATENT DOCUMENTS

| 4,096,447 A | 6/1978 | Fluhr |
| 4,426,707 A | 1/1984 | Martin et al. |
| 4,623,214 A | 11/1986 | Bazargan |
| 5,012,483 A | 4/1991 | Reintjes et al. |
| 5,043,998 A | 8/1991 | Cooper et al. |
| 5,946,337 A | 8/1999 | Govorkov et al. |
| 7,885,309 B2 * | 2/2011 | Ershov et al. ............ 372/57 |
| 7,903,700 B2 | 3/2011 | Nagai et al. |
| 8,014,432 B2 * | 9/2011 | Ye et al. .................. 372/55 |
| 8,116,347 B2 | 2/2012 | Wakabayashi et al. |
| 8,170,078 B2 * | 5/2012 | Ershov et al. ............ 372/57 |
| 8,183,536 B2 * | 5/2012 | Schreiber et al. ......... 250/372 |
| 8,520,186 B2 * | 8/2013 | Seong et al. ............. 355/52 |
| 2008/0291962 A1 | 11/2008 | Govorkov et al. |
| 2010/0108913 A1 * | 5/2010 | Ershov et al. ........... 250/492.1 |
| 2011/0069733 A1 * | 3/2011 | Ye et al. .................. 372/95 |
| 2011/0069734 A1 | 3/2011 | Pargmann et al. |
| 2011/0102759 A1 * | 5/2011 | Ershov et al. ............ 355/67 |
| 2011/0249691 A1 * | 10/2011 | O'Brien et al. ........... 372/25 |
| 2012/0002687 A1 * | 1/2012 | Ershov et al. ............ 372/20 |
| 2012/0087386 A1 * | 4/2012 | Brown et al. ............ 372/55 |

OTHER PUBLICATIONS

S. Haidar and H. Ito, "Injection-seeded optical parametric oscillator for efficient difference frequency generation in mid-IR," Optics Communications 171 Nov. 15, 1999, pp. 171-176.

(Continued)

*Primary Examiner* — David A Vanore
(74) *Attorney, Agent, or Firm* — DiBerardino McGovern IP Group LLC

(57) ABSTRACT

A deep ultraviolet light source includes a master oscillator producing a seed light beam; a regenerative ring amplifier receiving the seed light beam from the master oscillator and outputting an output light beam, the regenerative ring amplifier including a set of optical components that define a plane of a closed ring; and a divergence control device within the master oscillator or between the master oscillator and the regenerative ring amplifier and configured to reduce a divergence of the output light beam along a normal direction, the normal direction being perpendicular to the plane of the ring.

23 Claims, 18 Drawing Sheets

(56) References Cited

OTHER PUBLICATIONS

Om Prakash, et al., "Single-pulse time-resolved comparative study on the performance of a master-oscillator, power-amplifier copper-vapor-laser system with generalized diffraction-filtered and unstable resonators as master oscillators," Applied Optics, vol. 42, No. 18, Jun. 20, 2003, pp. 3538-3545.

A.E. Siegman, "Unstable Optical Resonators," Applied Optics, vol. 13, No. 2, Feb. 1974, pp. 353-367.
Dr. Ruediger Paschotta, "Unstable Resonators," RP Photonics at http://www.rp-photonics.com/unstable_resonators.html, captured on Oct. 18, 2011 using the Internet Archive Wayback Machine, 4 pages.
Alan H. Paxton, "Unstable Ring Resonator with an Intracavity Prism Beam Expander," Journal of Quantum Electronics, vol. QE-23, No. 2, Feb. 1987, pp. 241-244.

* cited by examiner

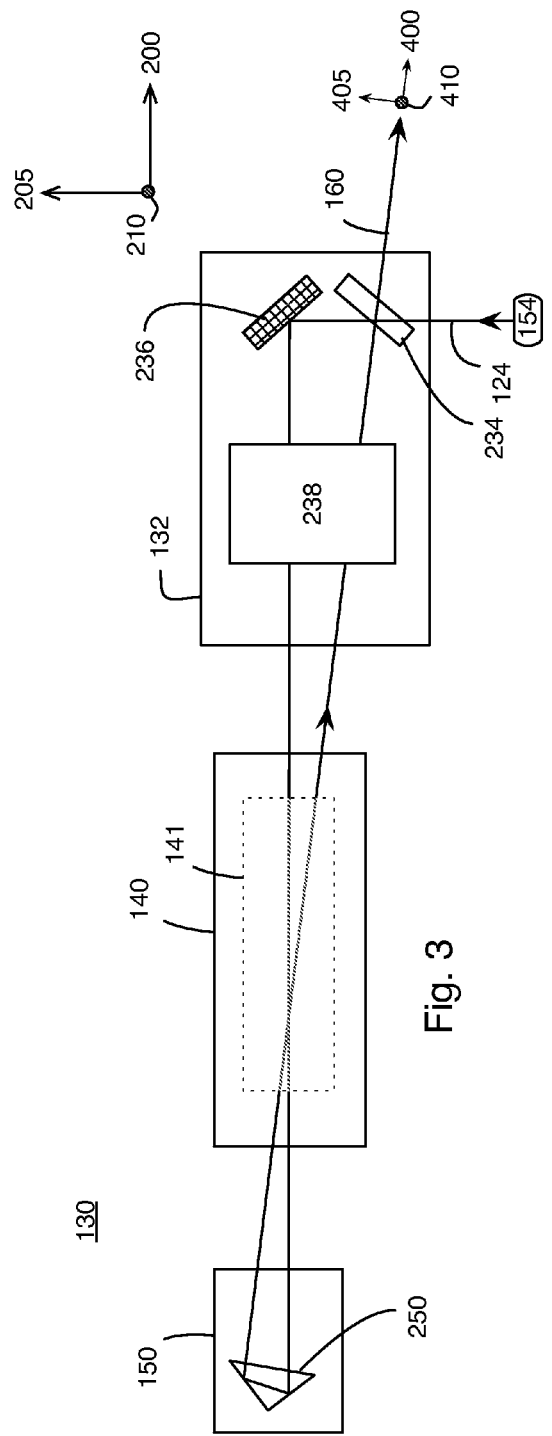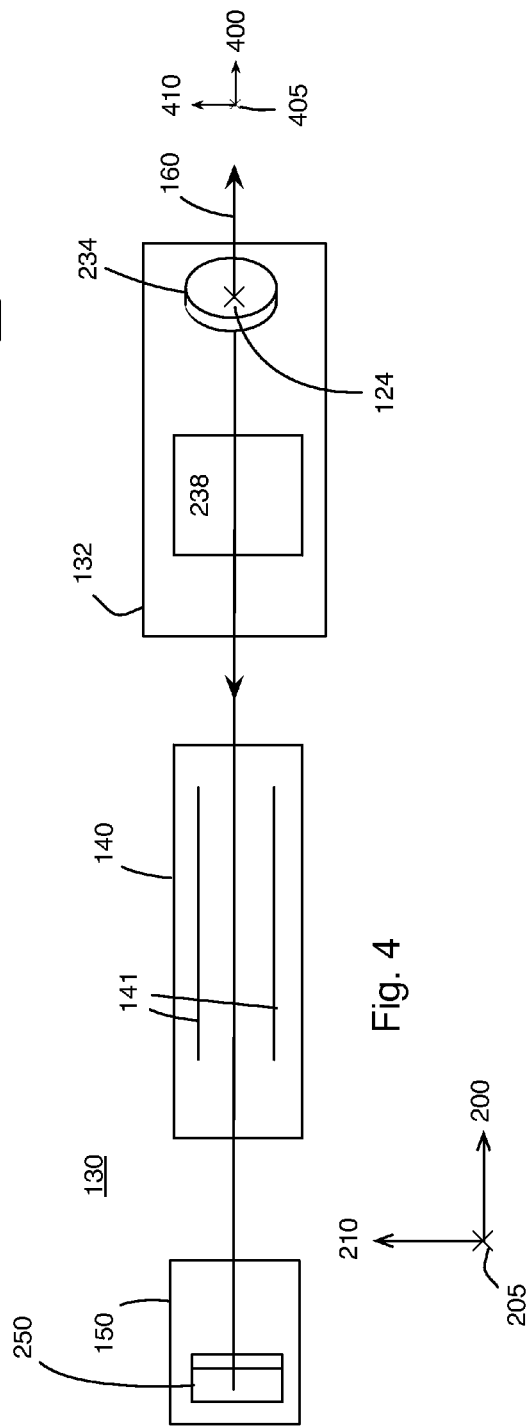

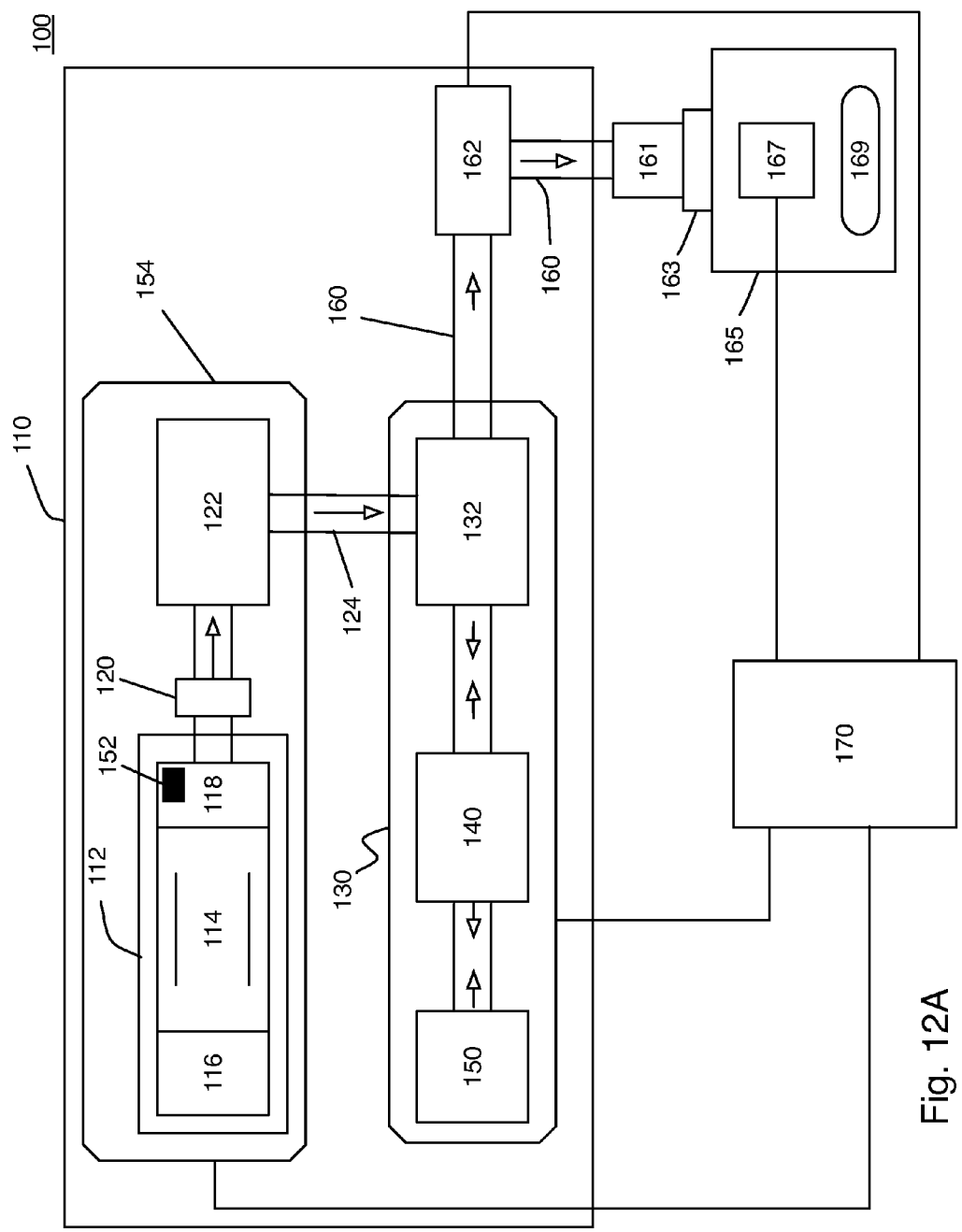

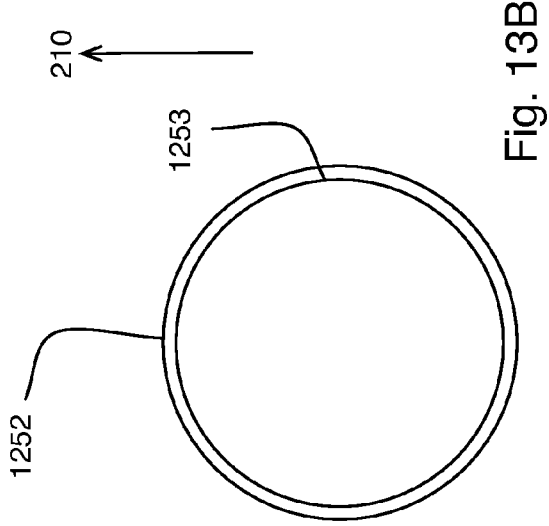
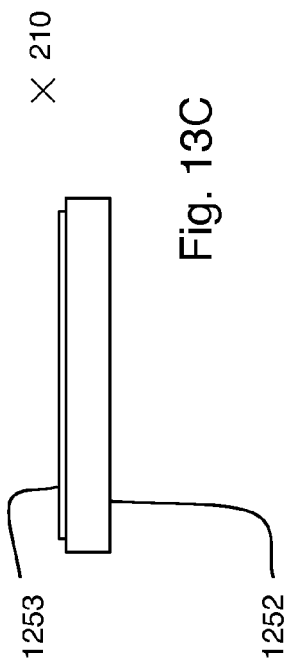
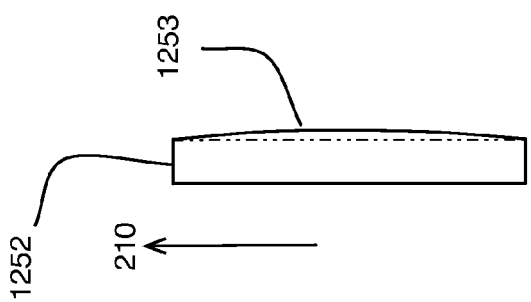
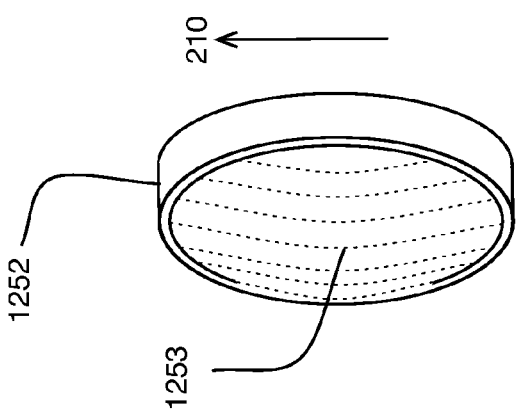

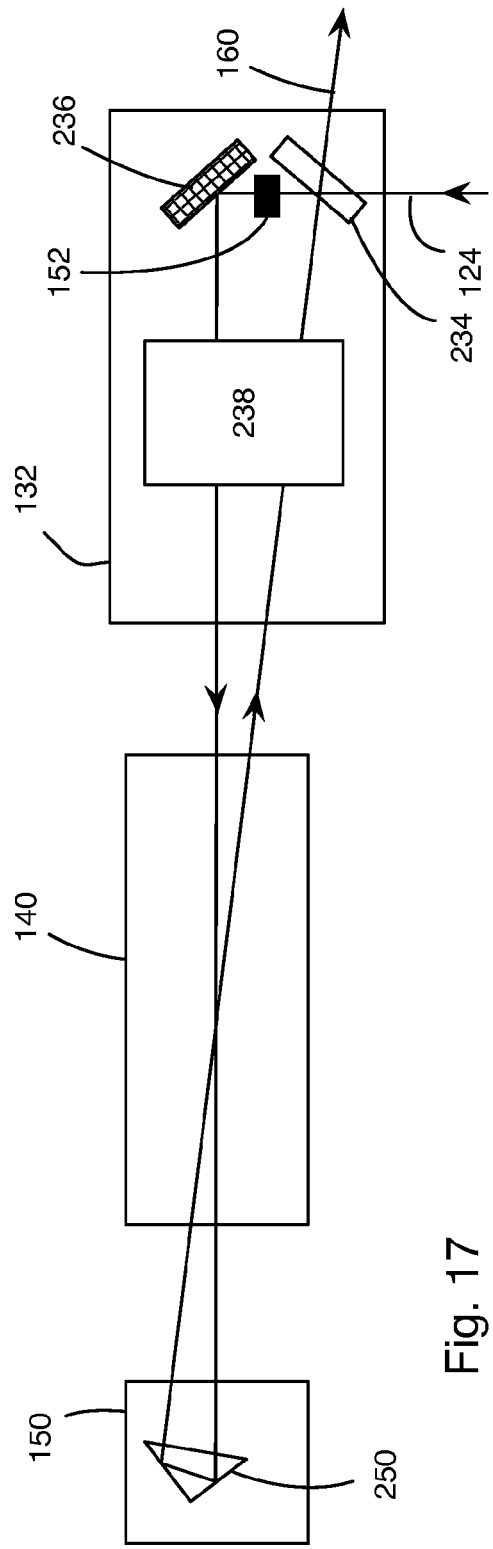

CONTROLLING SPATIAL PROPERTIES IN AN EXCIMER RING AMPLIFIER

TECHNICAL FIELD

The disclosed subject matter relates to controlling a spatial property such as divergence in a regenerative ring amplifier of a high power deep ultraviolet excimer two-stage light source.

BACKGROUND

Gas discharge lasers are used in photolithography to manufacture semiconductor integrated circuits. As semiconductor manufacturing has progressed to requiring smaller and smaller feature sizes (that is, the minimum feature size used to fabricate the integrated circuit), the design and performance of these lasers has improved. For example, gas discharge lasers have been redesigned to provide shorter wavelength and narrower bandwidth to support higher resolution, to provide higher powers to enable higher throughput, and to stabilize performance parameters such as dose, wavelength, and bandwidth.

Excimer lasers are one type of gas discharge laser used in photolithography that can operate in the ultraviolet (UV) spectral region at high average output power to generate nanosecond pulses at reduced spectral bandwidth.

In some cases, these lasers are designed with a dual chamber design having first and second chambers to separate the functions of providing narrow spectral bandwidth and generating high average output pulse energy. The first chamber is called a master oscillator (MO) that provides a seed laser beam and the second chamber is called a power amplifier (PA) or a power oscillator (PO). A master oscillator typically includes a gain medium in which amplification occurs and an optical feedback mechanism such as an optical resonator. The power amplifier typically includes a gain medium in which amplification occurs when pumped with the seed laser beam from the master oscillator. If the power amplifier is designed as a regenerative ring resonator then it is described as a power ring amplifier (PRA) and in this case, enough optical feedback can be provided from the ring design. The power amplifier receives the seed laser beam from the MO. The MO chamber enables fine tuning of parameters such as the center wavelength and the bandwidth at relatively low output pulse energies. The power amplifier receives the output from the master oscillator and amplifies this output to attain the necessary powers for output to use in photolithography. The dual chamber design can be referred to as a MOPA, MOPO, or MOPRA, depending on how the second chamber is used.

SUMMARY

In some general aspects, a deep ultraviolet light source includes a master oscillator producing a seed light beam; a regenerative ring amplifier receiving the seed light beam from the master oscillator and outputting an output light beam, the regenerative ring amplifier including a set of optical components that define a plane of a closed ring; and a divergence control device within the master oscillator or between the master oscillator and the regenerative ring amplifier and configured to reduce a divergence of the output light beam along a normal direction, the normal direction being perpendicular to the plane of the ring.

Implementations can include one or more of the following features. For example, the divergence control device can include a normal direction beam expander between the master oscillator and the regenerative ring amplifier.

The master oscillator can include an output coupler through which the seed light beam exits the master oscillator, and the divergence control device includes the output coupler, which is an optical device that is convex in the normal direction. The optical device can be a cylindrical convex lens. The optical device can be an output coupler of the master oscillator, in which the output coupler has a convex reflecting surface.

The divergence control device can include an image-rotating optical element. The image-rotating optical element can be a dove prism or an out-of-plane periscope. The divergence control device can include at least one optical element within a line-narrowing module of the master oscillator. The at least one optical element within the line-narrowing module of the master oscillator can be a refractive optical element having a curvature along the normal direction. The refractive optical element can have a concave curvature along the normal direction.

The divergence control device can include an optical device that is convex in the normal direction and a beam-limiting aperture arranged in the normal direction to limit the beam in the normal direction. The divergence control device can be between the master oscillator and the regenerative ring amplifier.

In another general aspect, a method is described for controlling a divergence of an output light beam in a normal direction that is perpendicular to a plane of a ring of a regenerative ring amplifier. The method includes producing a seed light beam by supplying current to electrodes on sides of a gain medium of a master oscillator; supplying current to electrodes on sides of a gain medium of a regenerative ring power amplifier that includes a set of optical components that define a plane of the ring; directing the seed light beam through an input/output optical coupler of the regenerative ring power amplifier; outputting an output light beam from the regenerative ring amplifier through the input/output optical coupler; and reducing a divergence of the output light beam along a normal direction, the normal direction being perpendicular to the plane of the ring, by modifying the seed light beam prior to directing the seed light beam through the input/output coupler of the regenerative ring amplifier.

In other general aspects, a method includes producing a seed light beam traveling along its own optical axis direction, and having a value for a spatial property taken along a first transverse direction that is defined in a plane perpendicular to its own optical axis direction and a value for the spatial property taken along a second transverse direction that is defined in the plane perpendicular to its own optical axis direction and is perpendicular to the first transverse direction; directing the seed light beam through a regenerative ring amplifier that includes a set of optical components that define an optical plane of the ring; outputting an output light beam from the regenerative ring amplifier, the output light beam traveling along its own optical axis direction, and having a value for the spatial property taken along a first transverse direction that is defined in a plane perpendicular to its own optical axis direction and a value for the spatial property taken along a second transverse direction that is defined in the plane perpendicular to its own optical axis direction and is perpendicular to the first transverse direction; and transforming the value of the spatial property in the first and second transverse directions of the seed light beam to thereby transform the value of the spatial property in the first and second transverse directions of the output light beam.

Implementations can include one or more of the following features. For example, the value of the spatial property can be transformed by rotating a beam profile of the seed light beam by 90 degrees. The value of the spatial property can be transformed by rotating a polarization of the seed light beam.

The value of the spatial property can be transformed by rotating the beam profile of the seed light beam so that after the rotating optical element: the spatial property value taken along the first transverse direction becomes the spatial property value taken along the second transverse direction, and the spatial property value taken along the second transverse direction becomes the spatial property value taken along the first transverse direction.

The spatial property can be a divergence.

In other general aspects, a deep ultraviolet light source includes a master oscillator producing a seed light beam traveling along its own optical axis direction, and having a value for a spatial property taken along a first transverse direction that is defined in a plane perpendicular to its optical axis direction and a value for the spatial property taken along a second transverse direction that is defined in the plane perpendicular to its optical axis direction and is perpendicular to the first transverse direction; a regenerative ring amplifier receiving the seed light beam from the master oscillator and outputting an output light beam, the regenerative ring amplifier including a set of optical components that define a plane of the ring, the output light beam traveling along its own optical axis direction, and having a value for the spatial property taken along a first transverse direction that is defined in a plane perpendicular to its optical axis direction and a value for the spatial property taken along a second transverse direction that is defined in the plane perpendicular to its optical axis direction and is perpendicular to the first transverse direction; and a rotational arrangement configured to transform the value of the spatial property in the first and second transverse directions of the seed light beam to thereby transform the value of the spatial property in the first and second transverse directions of the output light beam.

Implementations can include one or more of the following features. The rotational arrangement can include an image-rotating optical element. The rotational arrangement can include a polarization rotating optical element.

The rotational arrangement can include a rotating optical element that is configured to rotate the beam profile of the seed light beam so that after the rotating optical element: the spatial property value taken along the first transverse direction becomes the spatial property value taken along the second transverse direction, and the spatial property value taken along the second transverse direction becomes the spatial property value taken along the first transverse direction.

The spatial property can include a divergence.

DRAWING DESCRIPTION

FIG. 3 is a plan view taken along a direction that is normal to a planar ring of the power amplification system of the exemplary power amplification system of FIG. 2;

FIG. 4 is a plan view taken along a direction that is parallel to the planar ring of the exemplary power amplification system of FIG. 2;

Figure 10A:
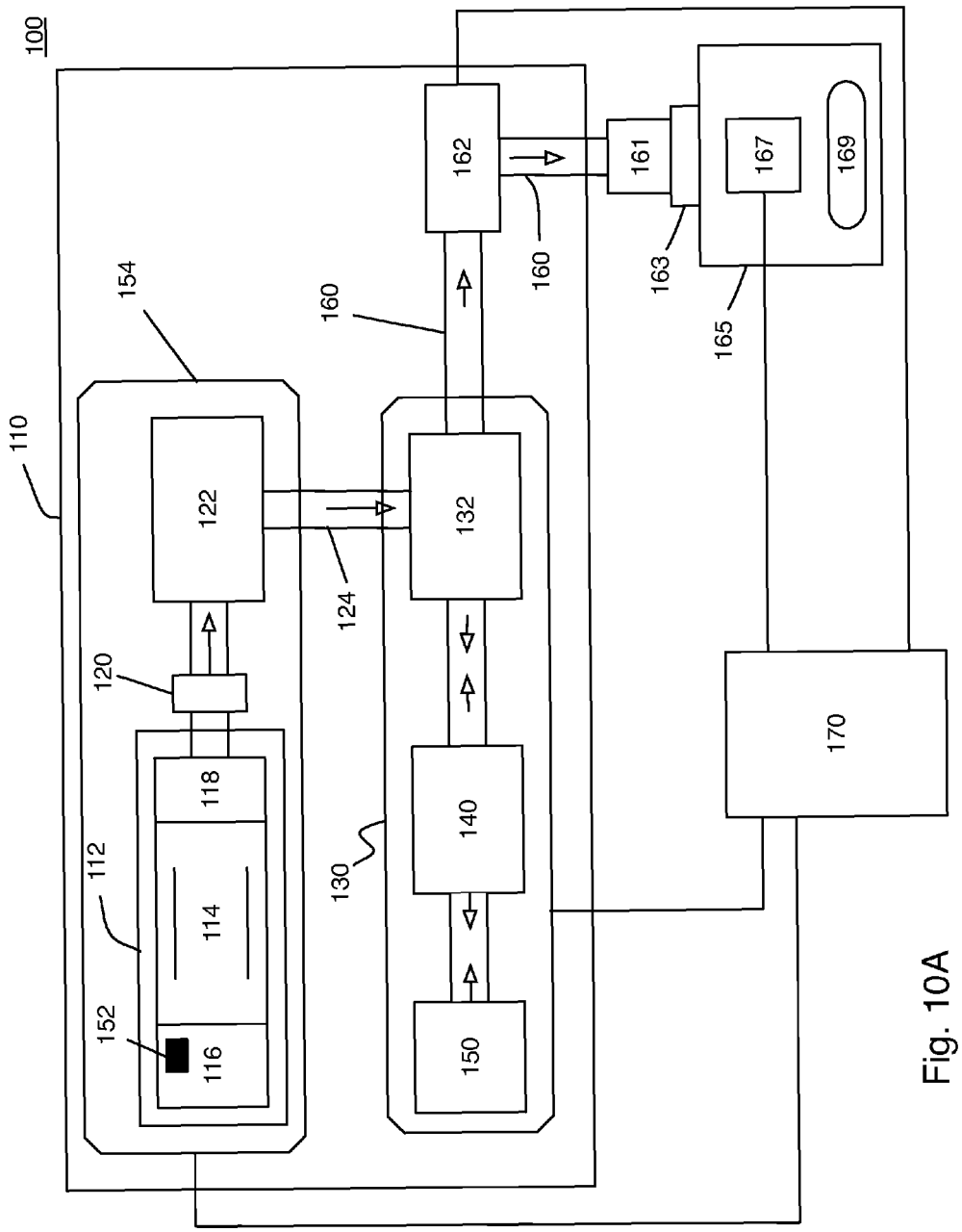
Figure 11A:
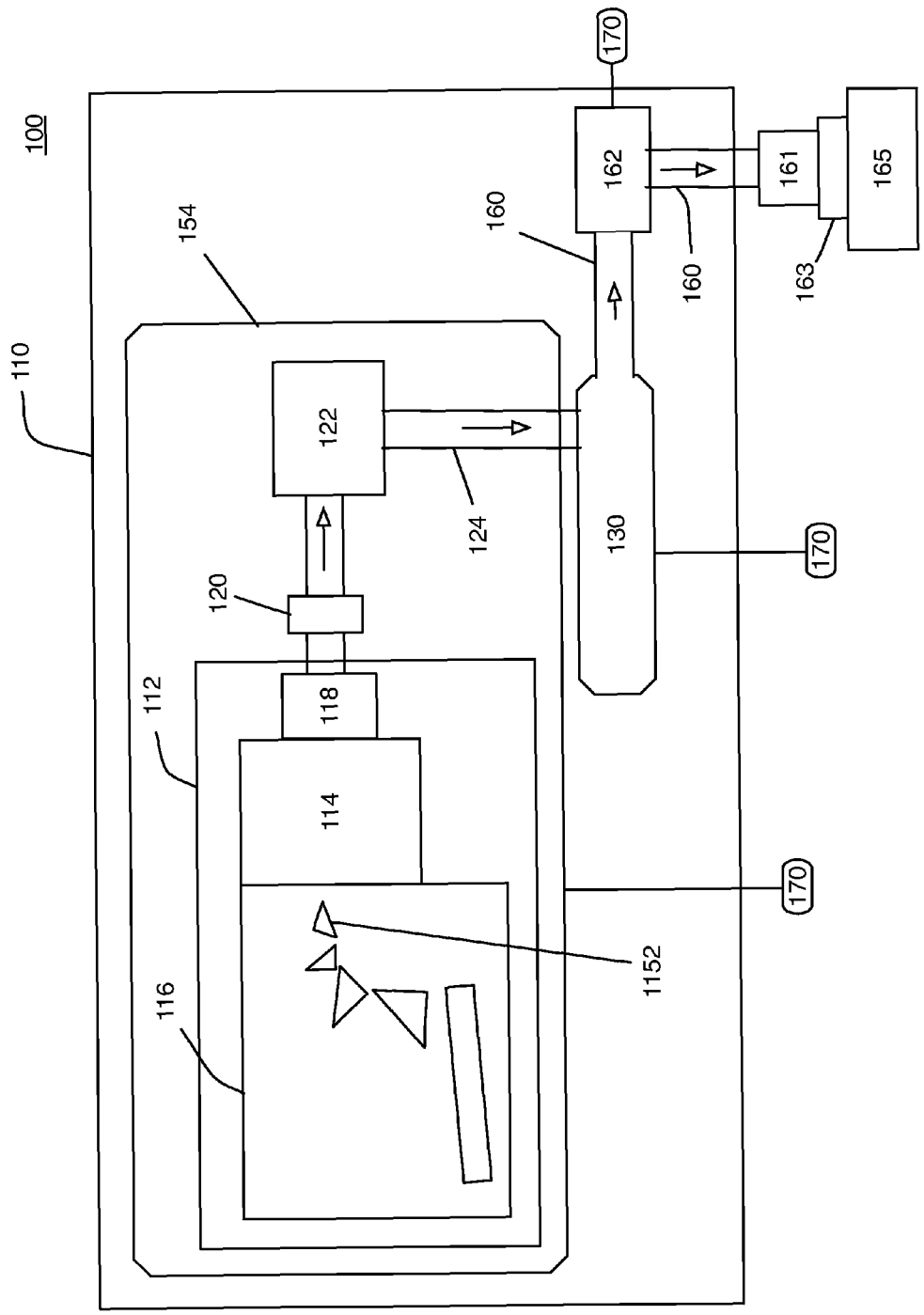
Figure 11B:
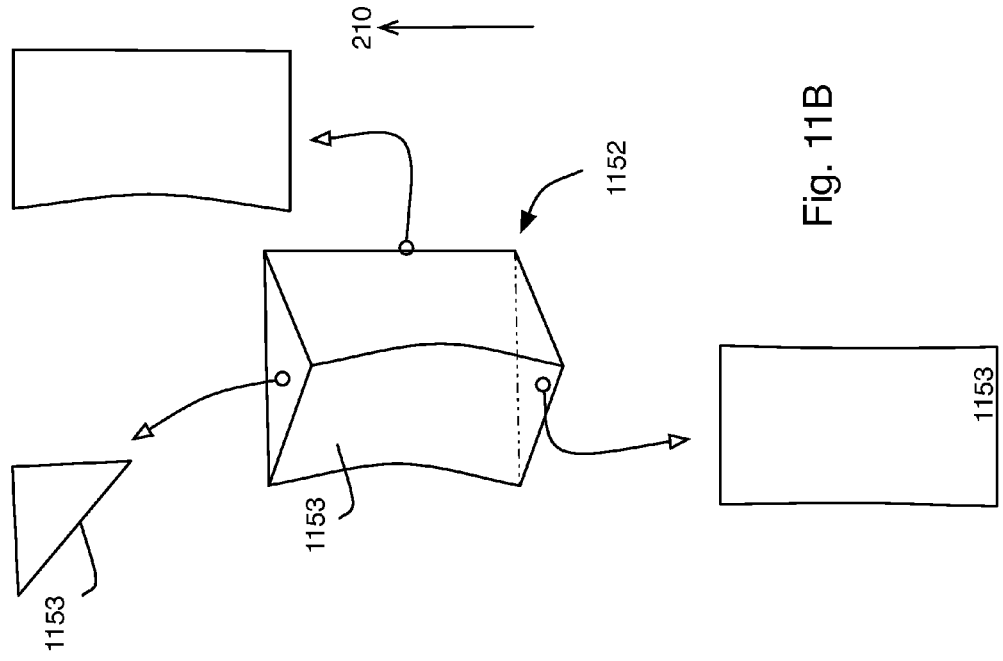
Figure 10B:
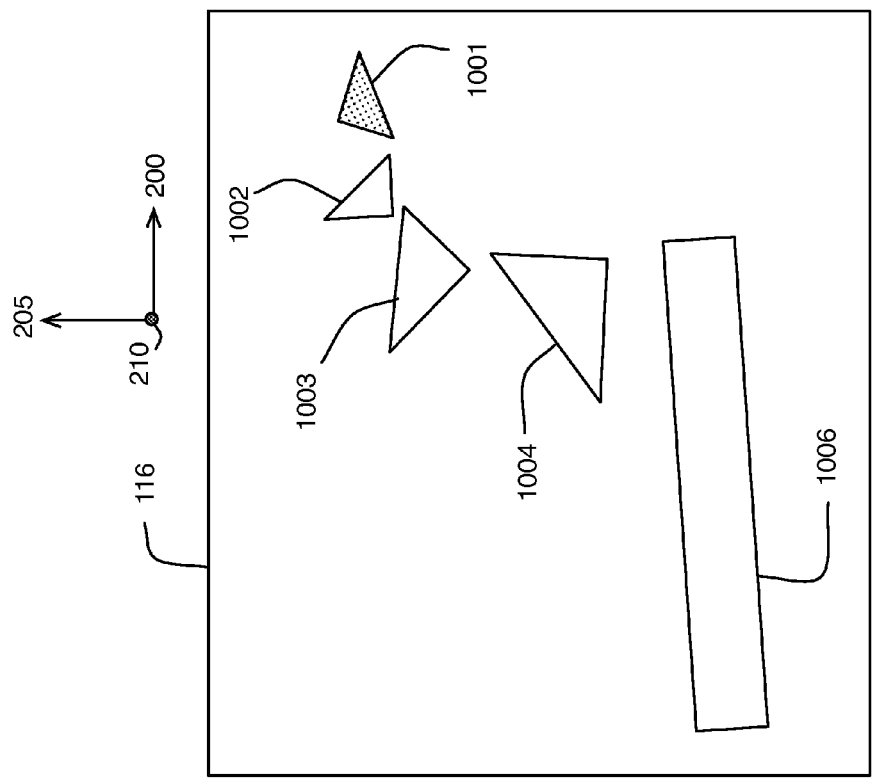
Figure 12B:
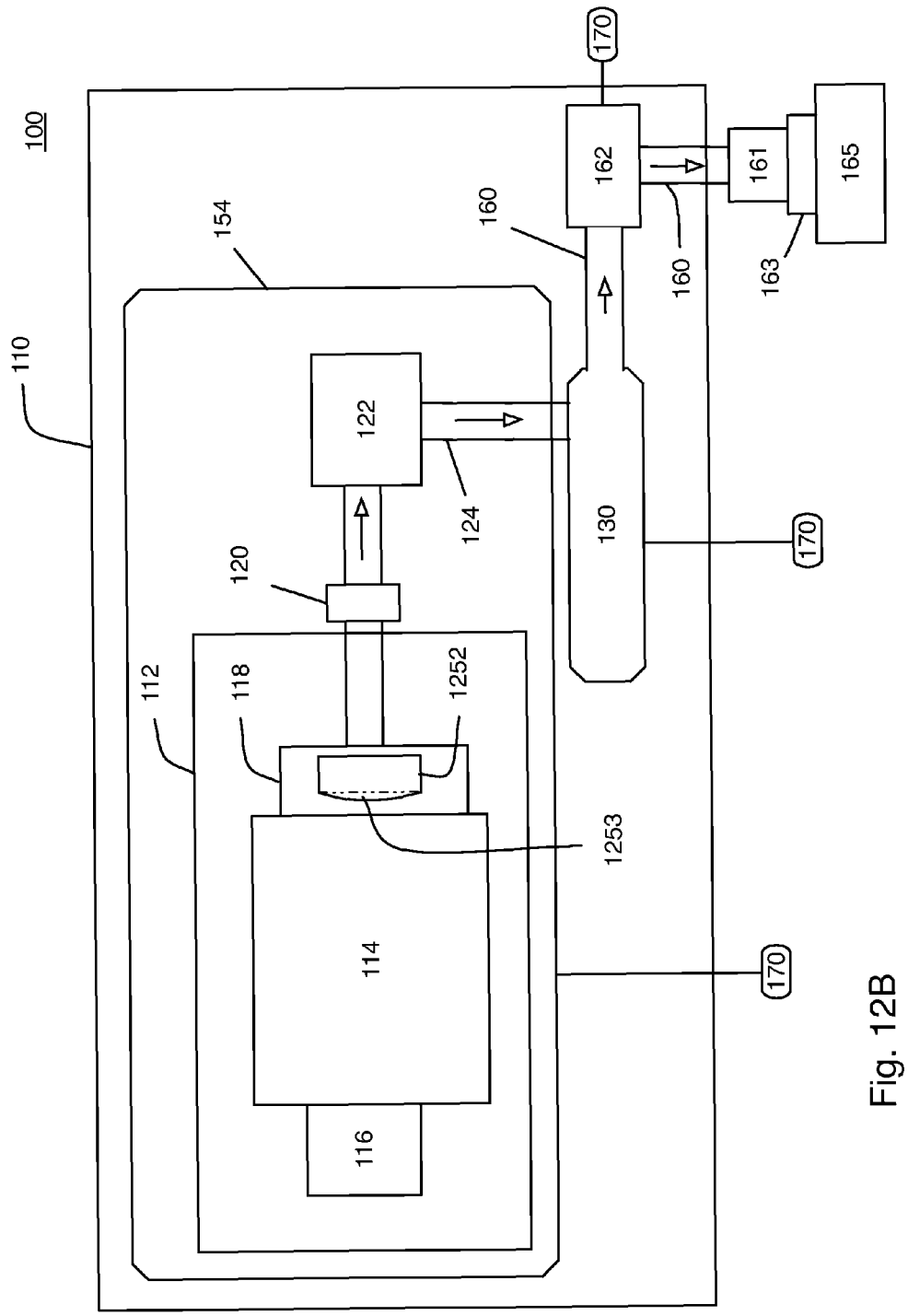
Figure 14:
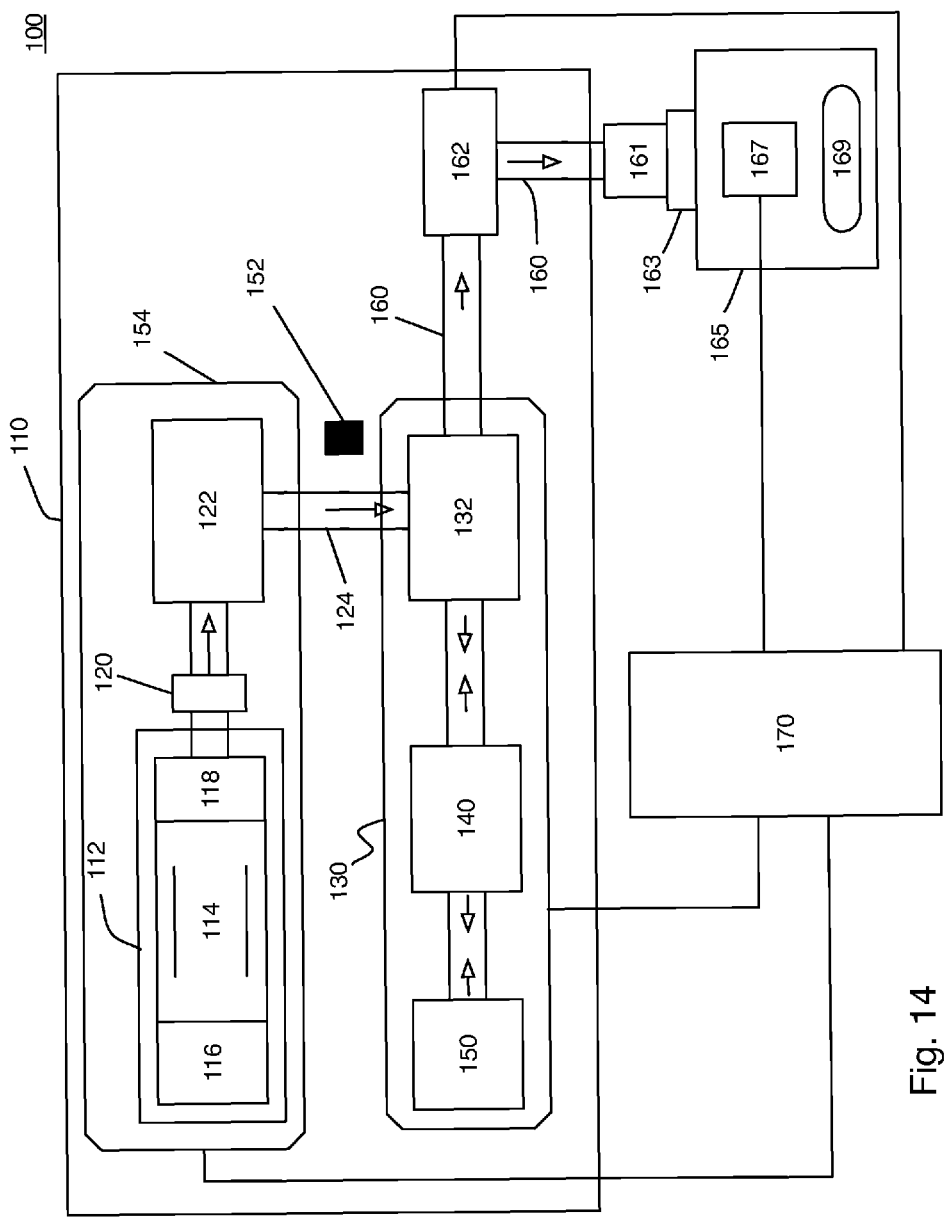
Figure 15A:
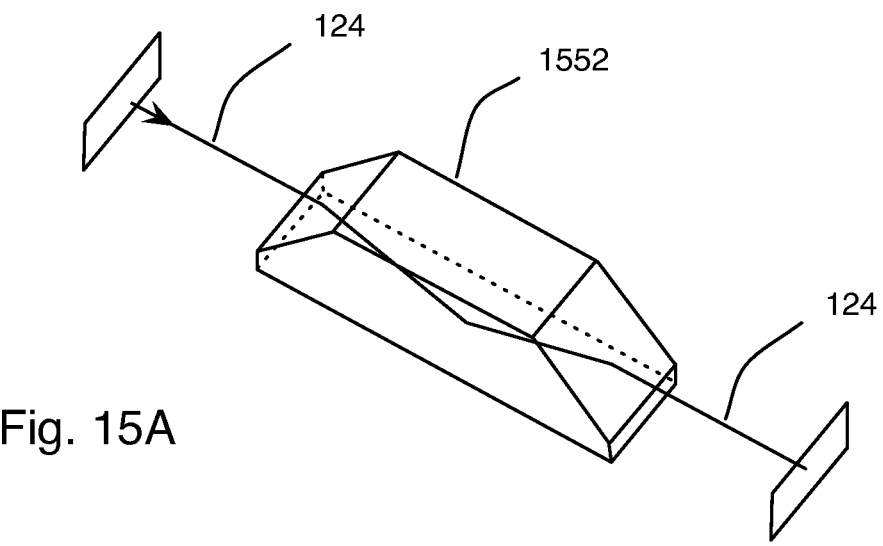
Figure 15B:
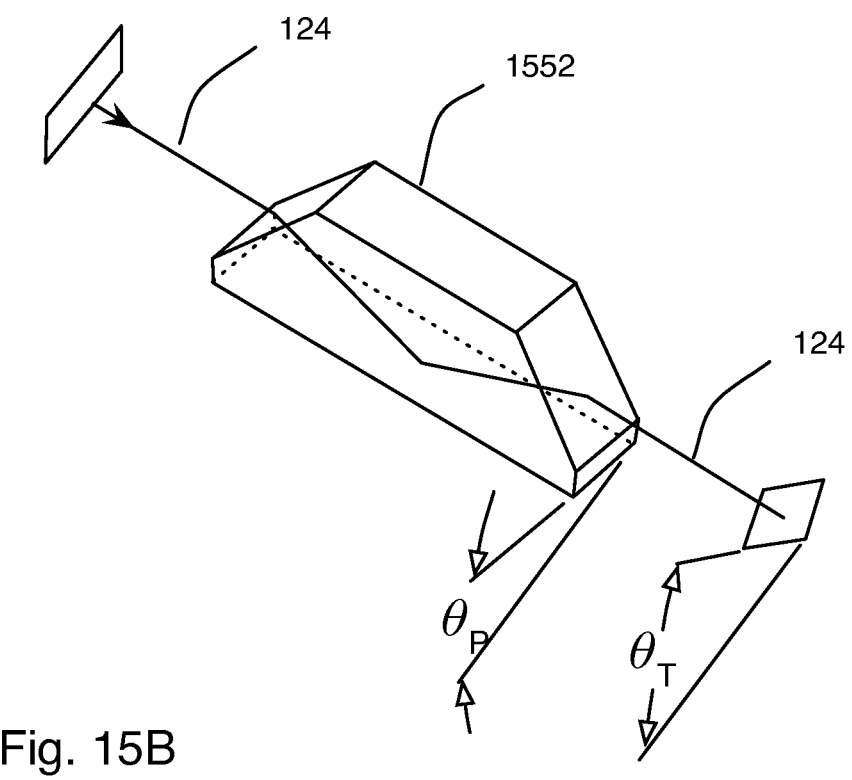
Figure 16:
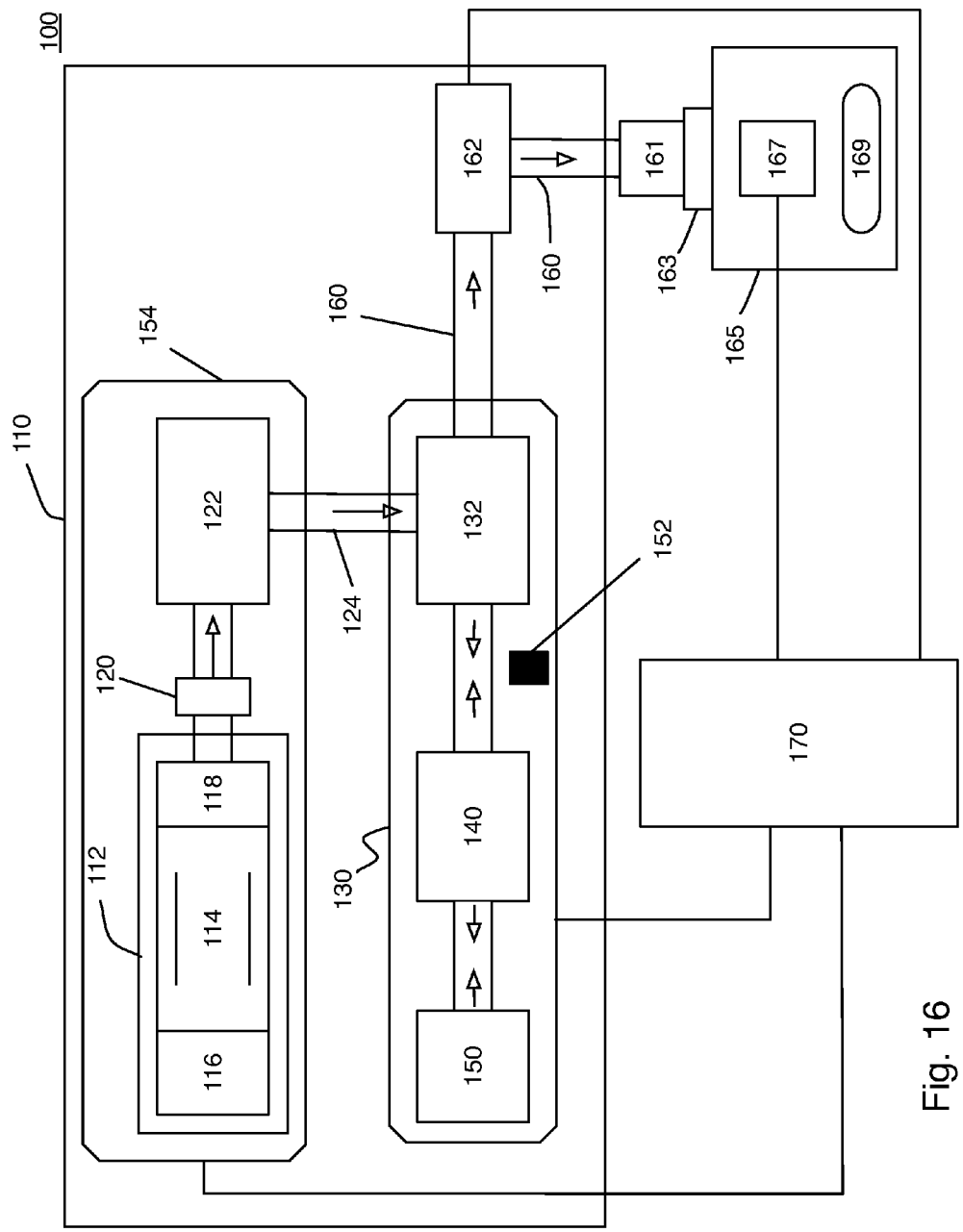
Figure 18A:
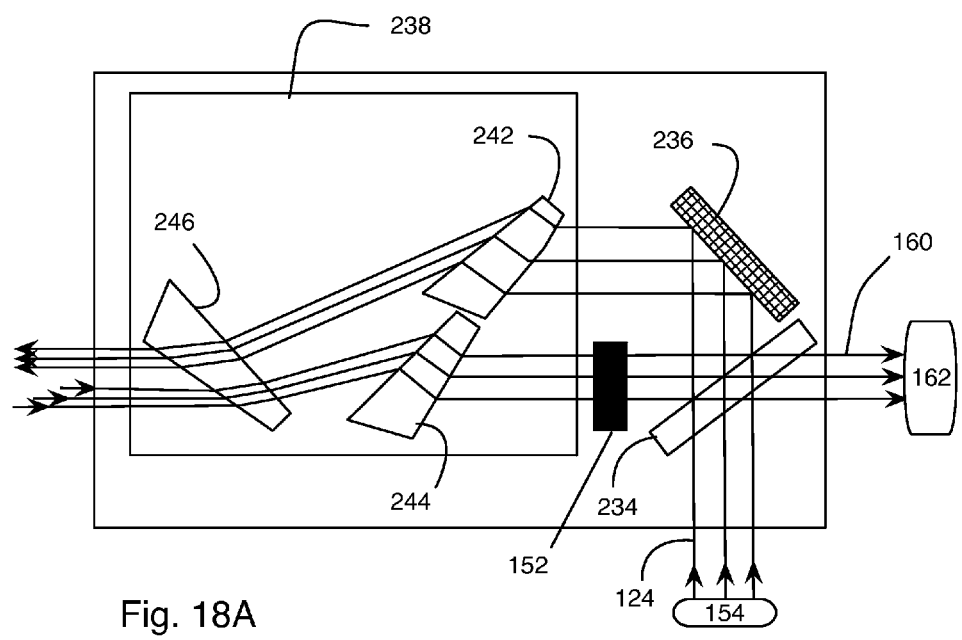
Figure 18B:
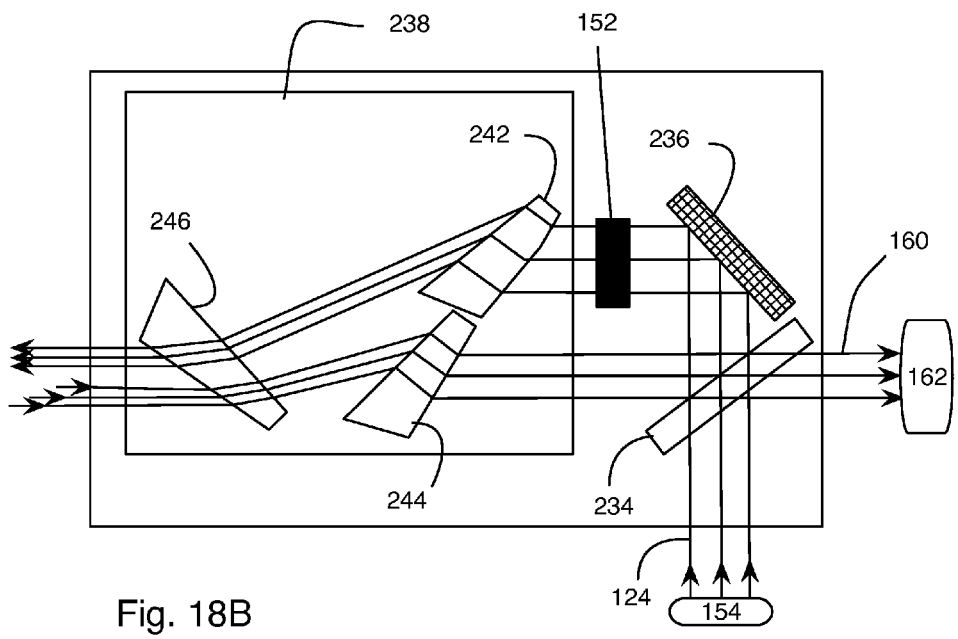

FIGS. 7, 8, 9, 10A, 11A, 12A, 12B, 14, and 16 are block diagram of exemplary photolithography systems including a deep ultraviolet light source and respective divergence control devices;

FIG. 10B is a top plan view of a line narrowing module of a master oscillator of the exemplary photolithography system of FIG. 10A;

FIG. 11B is a perspective view of a prism of the line narrowing module of FIG. 10B;

FIG. 13A is a perspective view of an output coupler of a master oscillator of the exemplary photolithography system of FIG. 12B;

FIGS. 13D and 13C are side plan views of the output coupler of FIG. 13A taken along sides that are transverse to an optical axis of a light beam that is produced by the master oscillator;

FIG. 13B is a side plan view of the output coupler of FIG. 13A taken along the optical axis of the light beam;

FIGS. 15A and 15B are perspective views of a divergence control device that can be used in the photolithography system of FIG. 14;

FIG. 17 is a plan view taken along a direction that is normal to a planar ring of the power amplification system of the exemplary power amplification system of FIG. 16; and FIGS. 18A and 18B are plan views of an exemplary beam magnification/de-magnification system of the power amplification system of FIG. 17.

DESCRIPTION

Figure 1:
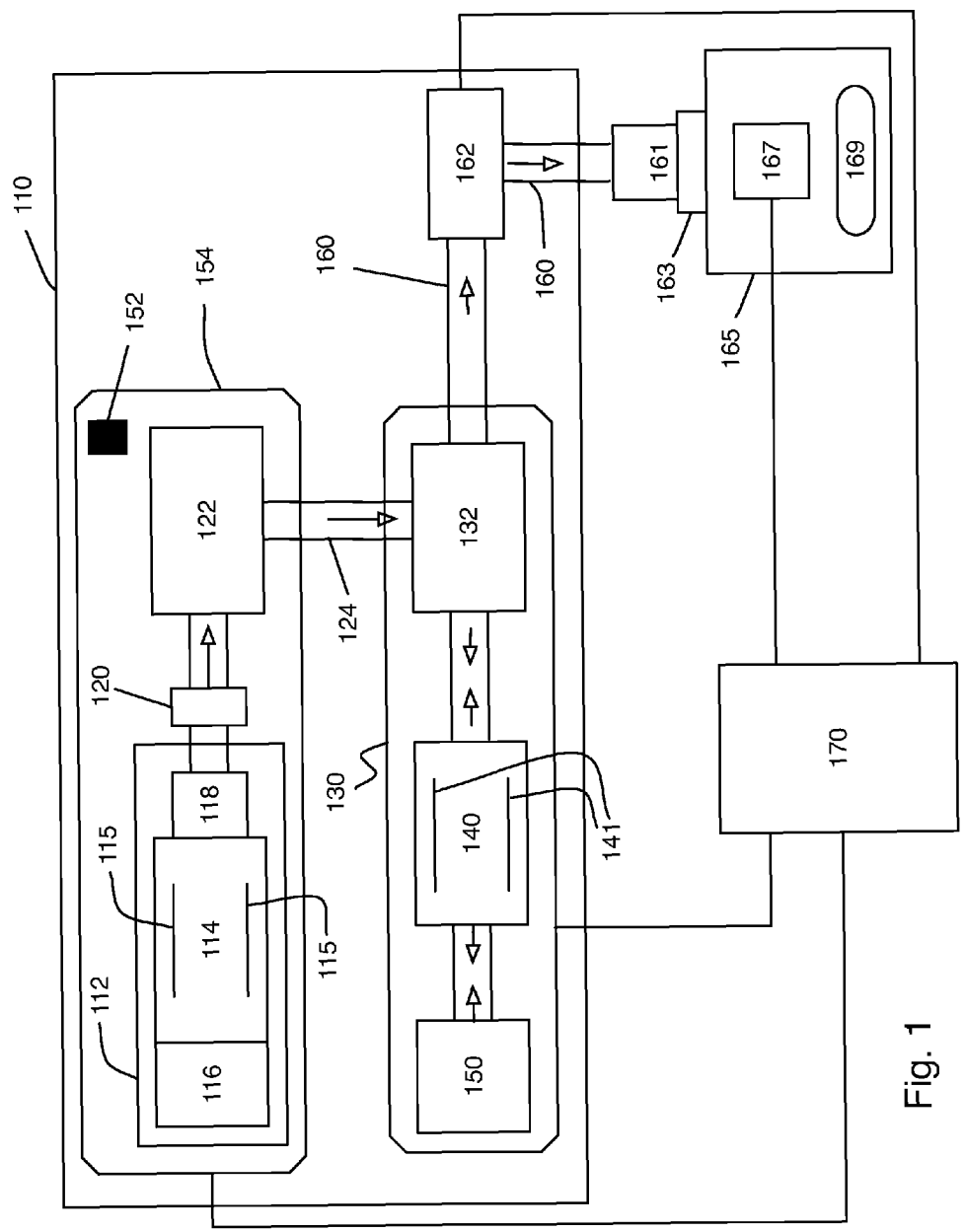
FIG. 1 is a block diagram of an exemplary photolithography system including a deep ultraviolet light source and a divergence control device.

Referring to FIG. 1, a photolithography system 100 includes a deep ultraviolet light source 110 such as an excimer light source that outputs a pulsed light beam 160 (which can be a laser beam) that is directed to a lithography exposure apparatus 165 after being sent through a beam delivery system 161 and an interface device 163. The light source 110 is designed as a dual chamber architecture that includes a master oscillator system 154 that produces a seed light beam 124, a power amplification system (PA) 130, shown in more detail in FIGS. 2-4, that receives the seed light beam 124 from the master oscillator system 154 and outputs the pulsed light beam 160.

The master oscillator system 154 includes a master oscillator 112, an optional line center analysis module 120 that receives an output from an output coupler 118 of the master oscillator 112 and performs diagnostic tests on the light output, and a beam modification optical system 122 that modifies the size or shape of the seed light beam as needed to form the seed light beam 124.

Figure 2:
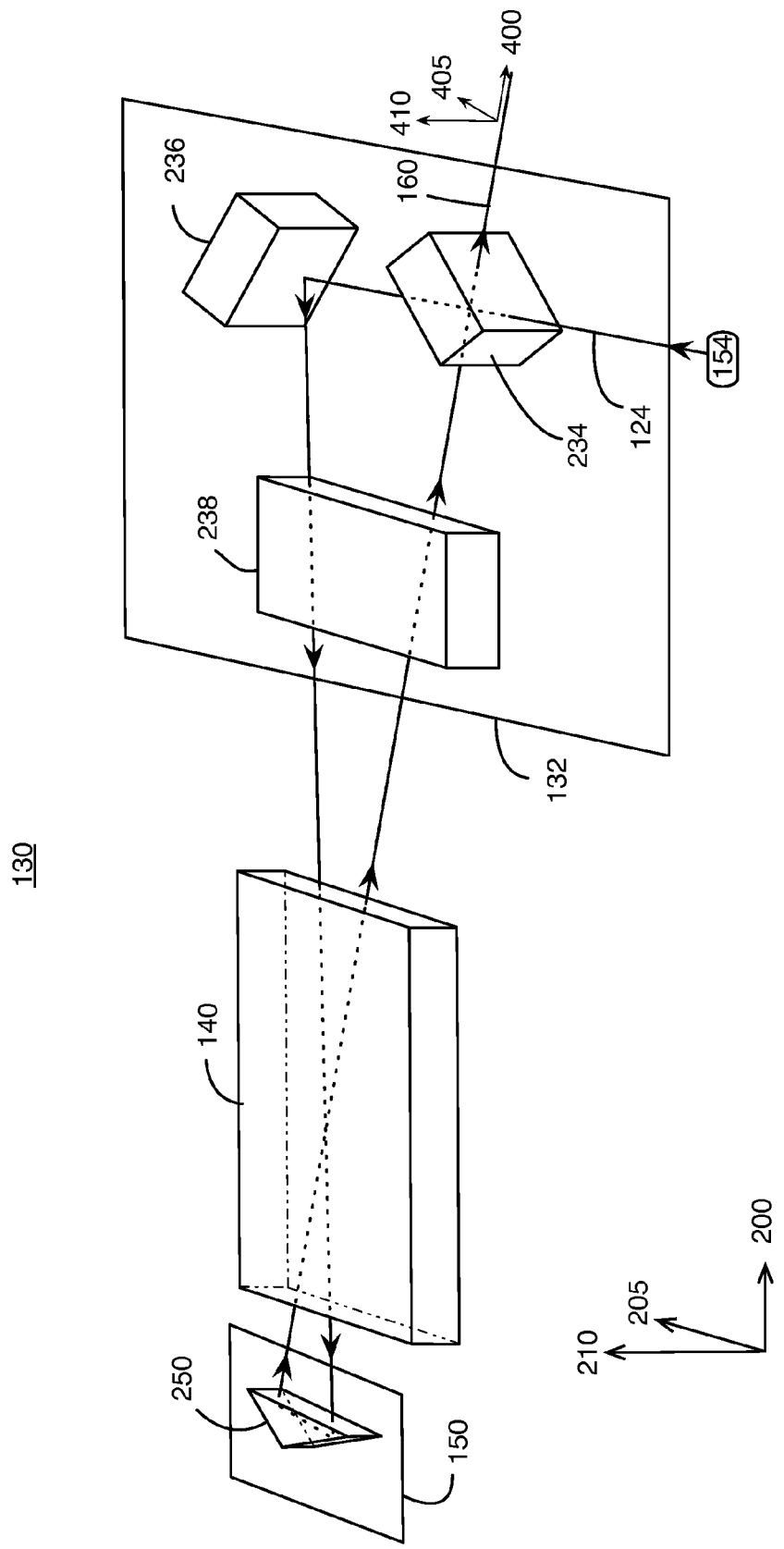
FIG. 2 is a perspective view of an exemplary power amplification system that can be used in the photolithography system of FIG. 1.

The power amplification system 130 can be configured as a regenerative ring resonator that includes a set of optical components that define a plane of the ring, as shown in FIGS. 2-4. Thus, the resonator can be planar, in which all of the optical components are arranged to produce a beam that travels within and is constrained within a two dimensional plane. The plane of the ring can be defined within a stationary coordinate system by the directions 200, 205, and the normal direction 210 is a direction that is perpendicular to the plane of the ring defined by directions 200, 205. Other coordinate systems can be used to define the plane of the ring. In some implementations, the plane of the ring can be horizontal to the surface of the earth and the normal direction 210 can be perpendicular to the surface of the earth.

The other coordinate system that needs to be considered is the optical axis coordinate system that travels with the path of the pulsed light beam 160. The optical axis coordinate system includes an optical axis direction 400, and two transverse spatial directions 405, 410. The direction 405 can generally extend along the plane of the ring defined by directions 200, 205, and the direction 410 that can be normal or perpendicular to the plane of the ring and thus is generally parallel with the stationary direction 210.

Generally, the seed light beam 124 and the pulsed light beam 160 have spatial properties along a direction transverse to the optical axis direction. For example, one spatial property exhibited by the seed light beam 124 and the pulsed light beam 160 is the divergence of the beam, which is a measure of how fast the beam expands in one of the transverse directions. It is possible that a particular spatial property (such as the divergence) of the seed light beam 124 along a first transverse direction is not within a desired range while the particular spatial property (for example, the divergence) of the seed light beam 124 along a second transverse direction is within the desired range. Moreover, the spatial property of the seed light beam 124 along the first transverse direction and along the second transverse direction can be entrained (that is, transferred) in the oscillation within the power amplification system 130, and thus, if the spatial property in the first transverse direction is out of desired range in the seed light beam 124, such undesirable spatial property can be amplified in the oscillation within the power amplification system 130. It is possible to attenuate the undesirable spatial property within the pulsed light beam 160 by modifying the spatial property of the seed light beam 124.

In view of this, the light source 110 includes a spatial property control device 152 (for example, a divergence control device 152) positioned within the master oscillator system 154 (or external to the power amplification system 130). In the following examples, the spatial property that is described is the beam divergence, but it is possible that other spatial properties can be modified using the control device 152.

Thus, the divergence control device 152 can be located within the master oscillator 112 or between the master oscillator 112 and the power amplification system 130 (for example, within the beam modification optical system 122). The divergence control device 152 is configured to modify (for example, reduce) a divergence of the pulsed light beam 160 along the normal direction 210 or 410. The divergence control device 152 can be an optical device that passively alters the divergence. For example, the divergence control device can include one or more of a refractive optical device, a reflective optical device, a beam blocking device, and an absorbing device. In the following implementations, the divergence control device 152 is not located within the power amplification system 130. Thus, the divergence of the pulsed light beam 160 output from the power amplification system 130 is controlled with a device 152 that is not within the power amplification system 130.

Figure 5A:
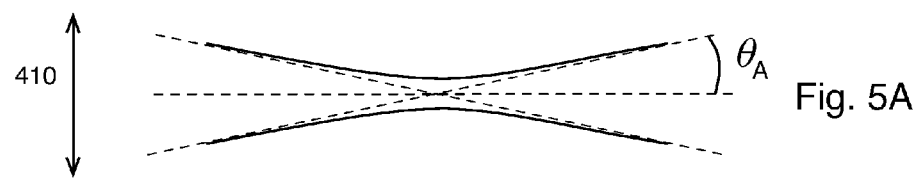
FIGS. 5A and 5B show side views of a light beam along two perpendicular directions to an optical axis of the light beam.
Figure 5B:
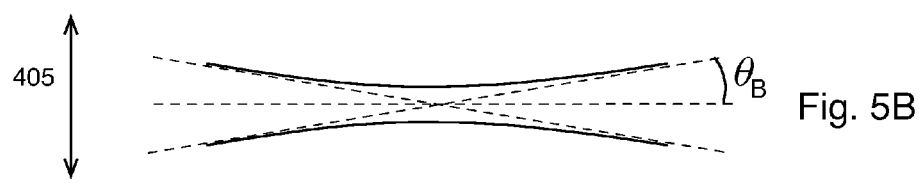

Referring to FIGS. 5A and 5B, the divergence of the pulsed light beam 160 is a measure of how fast the beam 160 expands in one of the directions 405, 410 that is transverse to the optical axis 400 of the beam 160 in the far field from a minimum near field profile size. As shown in FIG. 5A, the divergence can be taken along the direction 410, which is perpendicular to the optical axis of the beam 160 and also perpendicular to the plane of the ring. As shown in FIG. 5B, the divergence can be taken along the direction 405, which is also perpendicular to the optical axis of the beam 160 but is within the plane of the ring. Thus, the divergence of the pulsed light beam 160 is an angular measure of the increase in beam diameter along a transverse direction at a distance from the minimum near field profile size of the pulsed light beam 160. In some implementations, the minimum near field profile size can be near an input/output optical coupler of the power amplification system 130.

The divergence of the pulsed light beam 160 can be measured or considered at components within the lithography exposure apparatus 165, at the beam delivery system 161, or at the interface device 163. It is important to control the divergence of the pulsed light beam 160 at one or more of these locations. Before a full discussion of the divergence control using the device 152, more details about the photolithography system 100 are provided with respect to FIGS. 1-4.

The photolithography system 100 includes a control system 170 that is connected to components of the light source 110 as well as the lithography exposure apparatus 165 to control various operations of the system 100.

The master oscillator 112 enables fine tuning of parameters such as the center wavelength and the bandwidth at relatively low output pulse energies. The power amplification system 130 receives the output from the master oscillator 112 and amplifies the output to attain the necessary powers in the light beam 160 for output to use in the lithography apparatus 165.

The master oscillator 112 includes a discharge chamber 114 having two elongated electrodes 115, a gain medium that is a gas mixture, and a fan for circulating gas between the electrodes 115. A resonator is formed between a line-narrowing module 116 on one side of the discharge chamber 114 and the output coupler 118 on a second side of the discharge chamber 114. The line-narrowing module 116 can include a diffractive optic such as a grating that finely tunes the spectral output of the discharge chamber 114.

The gas mixture used in the discharge chamber 114 can be any suitable gas for producing a light beam at the required wavelength (ultraviolet) and bandwidth. For example, for an excimer source, the gas mixture typically contains a noble gas (rare gas) (for example, argon, krypton, or xenon) and a halogen (for example, fluorine or chlorine), apart from helium and/or neon as buffer gas. Specific examples of the gas mixture include argon fluoride (ArF), which emits light at a wavelength of about 193 nm, krypton fluoride (KrF), which emits light at a wavelength of about 248 nm, or xenon chloride (XeCl), which emits light at a wavelength of about 351 nm. The excimer gain medium (the gas mixture) is pumped with short (for example, nanosecond) current pulses in a high-voltage electric discharge by application of a voltage to the elongated electrodes 115.

The power amplification system 130 includes a beam modification optical system 132 that receives the seed light beam 124 from the master oscillator 112 and directs the light beam 124 through a discharge chamber 140, and to a beam turning optical element 150 where the direction of the light beam is modified so that it is sent back into and through the discharge chamber 140 toward the optical system 132. If the power amplification system 130 is designed as a regenerative ring resonator, then the light beam is directed through the power amplification system 130 to form a circulating and regenerative path.

The discharge chamber 140 includes a pair of elongated electrodes 141, a gain medium that is a gas mixture, and a fan for circulating the gas mixture between the electrodes 141. In the regenerative ring resonator design, the seed light beam 124 is amplified by repeatedly passing through the discharge chamber 140. The optical system 132 provides a way (for example, an optical coupler such as a partially-reflecting mirror, discussed below) to in-couple the seed light beam 124 and to out-couple a portion of the amplified radiation from the ring resonator to form the output pulsed light beam 160.

The output pulsed light beam 160 can be directed through a bandwidth analysis module 162, where various parameters of the beam 160 can be measured. The output pulsed light beam 160 can also be directed through a pulse stretcher, where each of the pulses of the output pulsed light beam 160 is stretched, for example, in an optical delay unit, to adjust for performance properties of the light beam that impinges the lithography apparatus 165.

The control system 170 is connected to various components of the light source 110. For example, the control system 170 is coupled to the electrodes 115, 141 within the master oscillator 112 and the power amplifier 130, respectively, for controlling the respective pulse energies of the master oscillator 112 and the power amplification system 130, and also for controlling the pulse repetition rates, which can range between about 1000 and 12,000 Hz or greater. The control system 170 therefore provides repetitive triggering of the discharges in the chamber of the master oscillator 112 and the discharges in the chamber of the power amplification system 130 relative to each other with feedback and feed-forward control of the pulse and dose energy. The output pulsed light beam 160 can have an average output power of between a few watts and hundreds of watts, for example, from about 40 W to about 200 W. The irradiance (that is, the average power per unit area) of the pulsed light beam 160 at the output can be at least about 60 W/cm$^2$ or at least about 80 W/cm$^2$.

The control system 170 is connected to one or more actuators within the line-narrowing module 116 so that it can act to adjust the properties of optical components within the line-narrowing module 116 to thereby control the bandwidth or wavelength of the seed light beam 124. The control system 170 can be connected to the line center analysis module 120 or to any other metrology systems that measure properties of the seed light beam 124 to enable further analysis of these properties. The information from such metrology systems can therefore be used to adjust the inputs to, for example, the master oscillator 112 or the power amplification system 130.

Typically, the output power of the light source 110 is calculated at 100% duty cycle (that is, the continuous firing of the electrodes in the master oscillator 112 and the power amplification system 130 of the light source 110) at a nominal pulse repetition rate and a nominal pulse energy. Thus, for example, at a nominal pulse repetition rate of 6000 Hz and a 15 mJ nominal pulse energy, the output power of the light source 110 (which is the power of the light beam 160) is 90 W. As another example, at a nominal pulse repetition rate of 6000 Hz and a 20 mJ nominal pulse energy, the output power of the light source 110 (which is the power of the light beam 160) is 120 W.

In the following examples, the power amplification system 130 is designed as a regenerative ring resonator. In such a design, a standard tilted double-pass optical path through the discharge chamber 140 is closed with the use of an optical coupler 234 to form a recirculating resonant structure that enables regenerative amplification of the seed light beam pulse from the master oscillator 112. The optical path is closed if the light beam that exits (for example, the pulsed light beam 160) the optical coupler 234 intersects the light beam 124 that enters (for example, the seed light beam 124) the optical coupler. The seed light beam 124 from the master oscillator 112 is directed through the optical coupler 234, which is a partially reflecting mirror (and can be referred to as an input/output coupler) and serves as both the entrance into the ring resonator and also the exit from the ring resonator. The optical coupler 234 can have a reflectivity of between about 10% to about 60%; to form an oscillation cavity that allows the pulse intensity to build up during the oscillation through the excited gain medium in the discharge chamber 140 between the electrodes during the electrical discharge.

The light beam that travels through the optical coupler 234 toward the discharge chamber 140 of the power amplification system 130 is reflected from a reflecting optic such as a mirror 236. The mirror 236 can have a high reflectivity, for example greater than about 90% at or near the center wavelength of the light beam for the desired polarization at the angle of incidence used. The light beam reflected from the mirror is directed through the discharge chamber 140 and toward the beam turning optical element 150, which in this implementation is a prism 250. The light beam reflected from two surfaces of the prism 250 reenters the discharge chamber 140 along another path and back toward the optical coupler 234, where, as discussed above, it intersects the seed light beam 124 entering the power amplification system 130. Some of this return light beam (coming from the discharge chamber 140) is reflected back into the ring resonator while some of the light beam (coming from the discharge chamber 140) is transmitted through the optical coupler 234 as the output pulsed light beam 160.

The beam turning optical system 150 is an optical system made of one or more precision devices having precision optical materials such as materials having a crystalline structure such as calcium fluoride (CaF2) and also includes precision optically finished faces. Although a prism 250 is shown in these examples, the beam turning optical system 150 can be any combination of one or more optical devices that receive the light beam and change the direction of the light beam so that it is transmitted back into the discharge chamber 140. Thus, in other implementations, the beam turning optical system 150 can include a plurality of mirrors arranged to reflect the light beam back into the discharge chamber 140.

Additionally, the light beam that is reflected from the mirror 236 through the discharge chamber 140 is usually compressed before entering the discharge chamber 140 so that it can substantially match the transverse size of the gain medium in the discharge chamber 140. If the light beam is compressed before entering the discharge chamber 140, then it is also expanded as it exits the discharge chamber 140. In order to perform the compression and expansion, a beam magnification/de-magnification system 238 is positioned between the discharge chamber 140 and the mirror 236 and optical coupler 234. The beam magnification/de-magnification system 238 can include any number of optical elements such as prisms to perform the compression and expansion of the beam. The design of the system 238 is discussed below with reference to FIG. 6.

The pulsed light beam 160 can be directed through a system aperture for further control of the beam profile and size, and from the system aperture it is directed through the beam delivery system 161, which modifies optical properties of the pulsed light beam 160 to prepare it to be delivered to the lithography exposure apparatus 165. For example, the beam delivery system 161 can include filters, attenuators, beam expanders, mirrors, and sensors. The pulsed light beam 160 is guided through the interface device 163, which can be an aperture sized to select a spatial portion of the beam profile for use in the lithography exposure apparatus 165. For example, the interface device 163 can be a slit.

As the pulsed light beam 160, which is output from the beam delivery system 161 through the interface device 163, enters the lithography exposure apparatus 165, it is directed through optics 167 that modify the beam such as a reticle (or mask) that filters the beam, and that modified beam is projected onto a prepared wafer 169. In this way, a chip design is patterned onto a photoresist that is then etched and cleaned, and the process repeats. The lithography exposure apparatus 165 can be an immersion system or a dry system, depending on the application.

Figure 6:
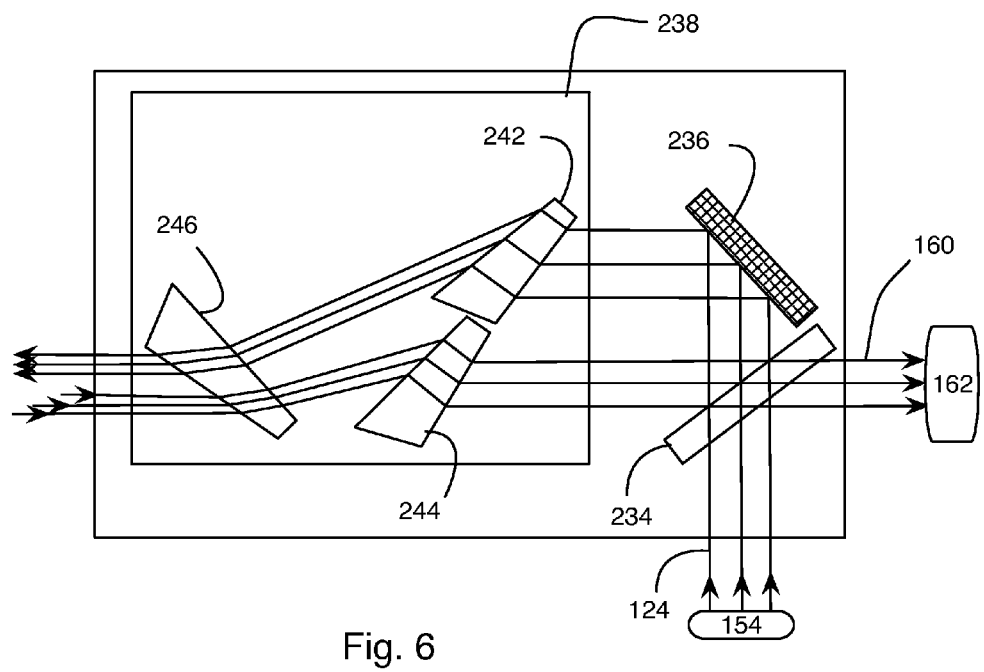
FIG. 6 is a plan view taken along the normal direction of an exemplary beam magnification/de-magnification system of the power amplification system of FIG. 2.

Referring to FIG. 6, one particular implementation of the beam magnification/de-magnification system 238 is shown. This system 238 includes first prism 242, second prism 244, and third prism 246. The first prism 242 and the third prism 246 act together to compress the incoming light beam 124, and the third prism 246 also aligns the incoming light beam with both windows of the discharge chamber 140. The third prism 246 shifts the outgoing light beam (which has been reflected by the prism 250 back through the discharge chamber 140) to the second prism 244, which shifts the light beam to the optical coupler 234. The third prism 246 and the second prism 244 act together to magnify or expand the outgoing light beam, the one that exits the discharge chamber 140 toward the optical coupler 234, to match the transverse size of the seed light beam 124. The outgoing light beam impinges upon the optical coupler 234 at the surface through which the seed light beam 124 crosses, and it is either transmitted through the optical coupler 234 to form the pulsed light beam 160 or it is reflected back into the ring resonator.

All of the optical components (such as the optical coupler 234, the mirror 236, the prisms 242, 244, 246, 250, and the chamber windows) are typically crystalline structures that are able to transmit very high pulse energy light or laser pulses at very short wavelengths (deep ultraviolet wavelengths) with minimal losses. For example, the components can be made of calcium fluoride (CaF2), magnesium fluoride (MgF2), or fused silica.

The following discussion uses the terms "beam profile," "near field," and "far field" to describe some of the optical effects noticed within the system 100. The term "beam profile" is the distribution of energy in position across a direction that is transverse to the beam propagation direction (such as, for example, the optical axis 400 of the pulsed light beam 160). The "near field" beam profile refers to the distribution of electromagnetic energy in the vicinity of an object (for example, an aperture or a mask) that changes a shape of the beam. The "far field" beam profile is the distribution of electromagnetic energy far away from the object.

As mentioned above, the divergence of the output light beam 160 along the normal direction 210 (which is parallel with the direction 410), can be controlled by using the divergence control device 152. One way to determine the divergence properties of the light beam as it travels through the power amplification system 130 is to measure the divergence of the light beam output from the power amplification system 130 while it is in free-running mode, which means that there is no injected signal (seed light beam 124) from the master oscillator system 154. For example, as shown in FIG. 5B, in free-running mode, the divergence $\theta_B$ of the output pulsed light beam 160 along the direction 405 that is in the plane of the ring (defined by directions 205 and 200) can be below about 0.5 milliradian (or about 0.03°), for example, about 0.2 milliradian (or about 0.01°). On the other hand, as shown in FIG. 5A, the divergence $\theta_A$ of the output pulsed light beam 160 along the direction 410 (which is parallel with the normal direction 210) can be as high as 2 milliradian (or about 0.1°). For clarity, the depictions of these angles in FIGS. 5A and 5B are highly exaggerated to show the concepts.

It was noticed by experiment that the divergence $\theta_A$ of the light beam along the normal direction 210 or 410 while in free-running mode is dramatically reduced (for example, to around 65% of a geometrically limited value) when the regeneration of the ring resonator is highest, which happens when the ring resonator is truly closed (the output light beam exactly overlaps the input light beam at the optical coupler 234. On the other hand, when the power amplification system 130 is fed with the injected signal (the seed light beam 124 from the master oscillator system 154), the energy of the output light beam 160 greatly depends on the direction at which the output light beam 160 exits the power amplification system 130, and in particular the direction as measured from the plane of the ring.

The divergence $\theta_A$ of the light beam 160 along the normal direction 210 can be too high in free-running mode, it is possible to adjust the divergence $\theta_A$ by adjusting properties of the seed light beam 124 that is input into the power amplification system 130. Additionally, it may be important to adjust the parameters of the light beam 160 such as the divergence $\theta_A$ along the normal direction 210 depending on the geometry of the interface device 163. If the divergence $\theta_A$ is too large, then it can be possible that too much of the light beam is blocked at the interface device 163 along the normal direction 410.

Figure 7:
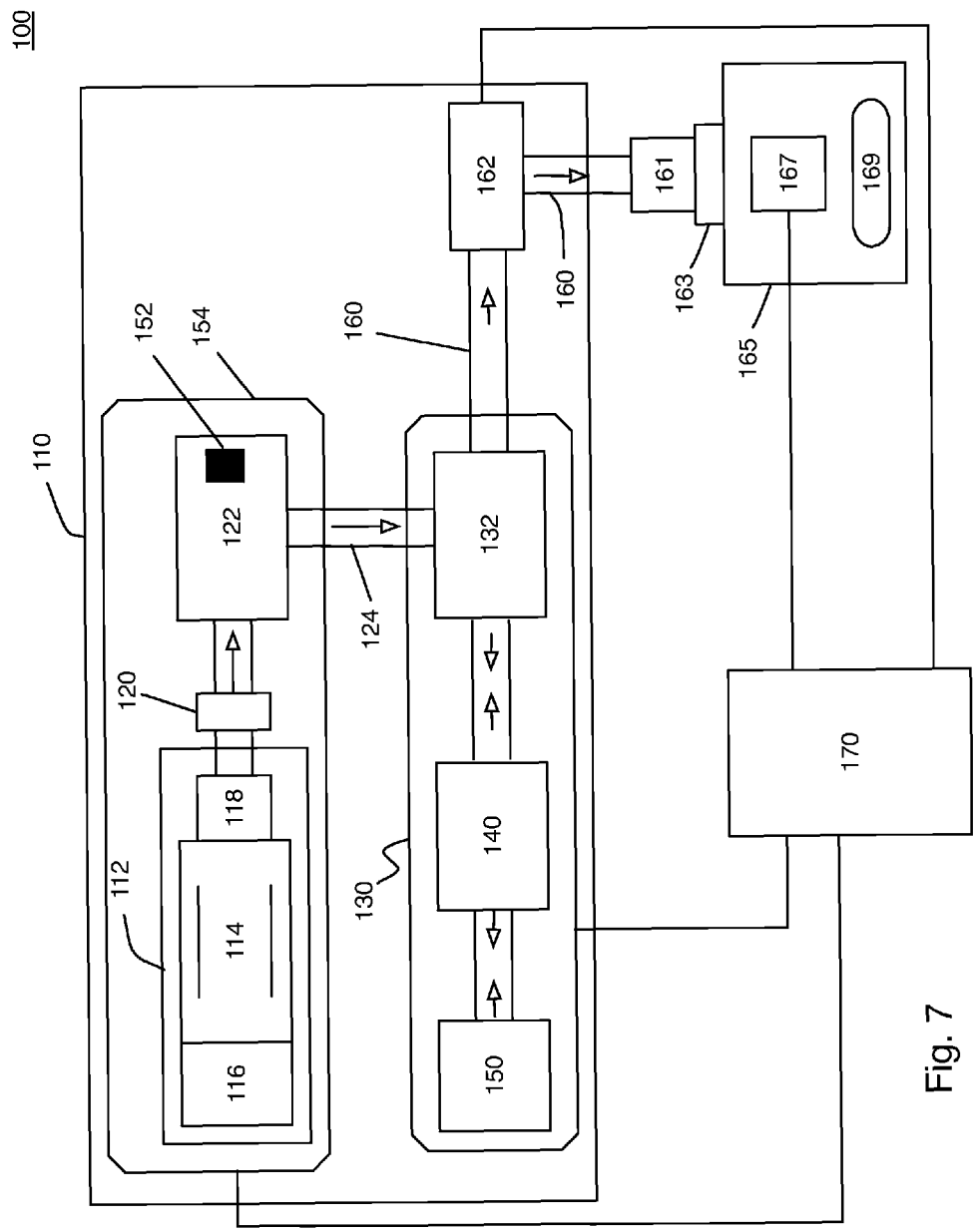

Referring to FIG. 7, an exemplary photolithography system 100 is shown in which the divergence control device 152 is placed in a generic location within the beam modification optical system 122, which includes all optical components between the master oscillator 112 and the power amplification system 130.

Figure 8:
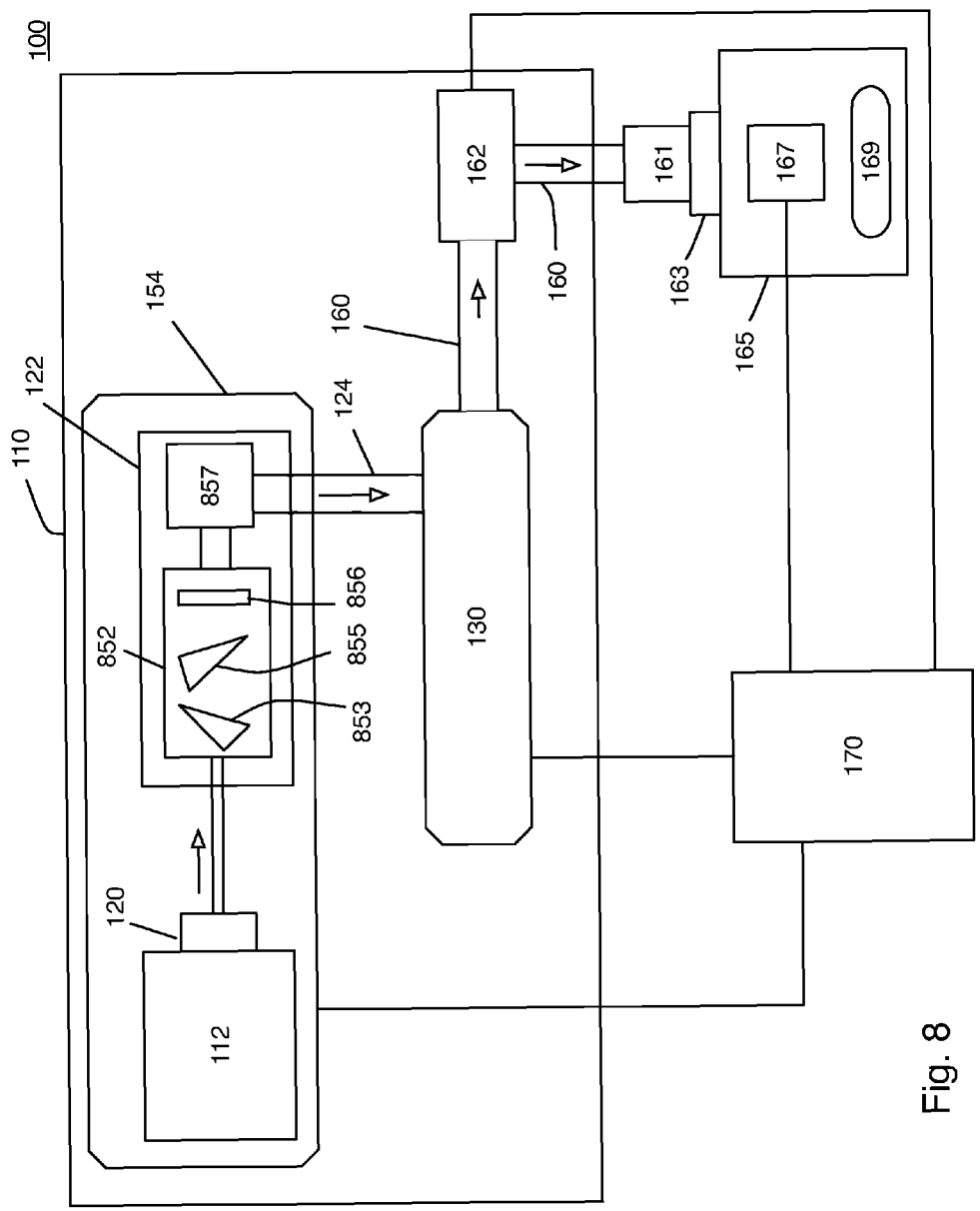

For example, as shown in FIG. 8, the divergence control device 152 can be a beam expander 852 placed in the path of the light beam as it travels from the master oscillator 112 toward the power amplification system 130. The beam modification optical system 122 can also include other optical components 857 such as reflective or refractive optical devices for controlling other aspects of the light beam.

In this example, the beam expander 852 acts to expand the beam profile of the seed light beam 124 along the normal direction 210 using a pair of prisms 853, 855 and a light aperture 856 that rejects divergences significantly greater than what is desired. When injected with the seed light beam 124, and with the addition of the beam expander 852 within the master oscillator system 154, the divergence $\theta_A$ of the output light beam 160 in the far field can be reduced by 50% of the value of the divergence $\theta_A$ of the output light beam 160 that is obtained without the beam expander 852.

Figure 9:
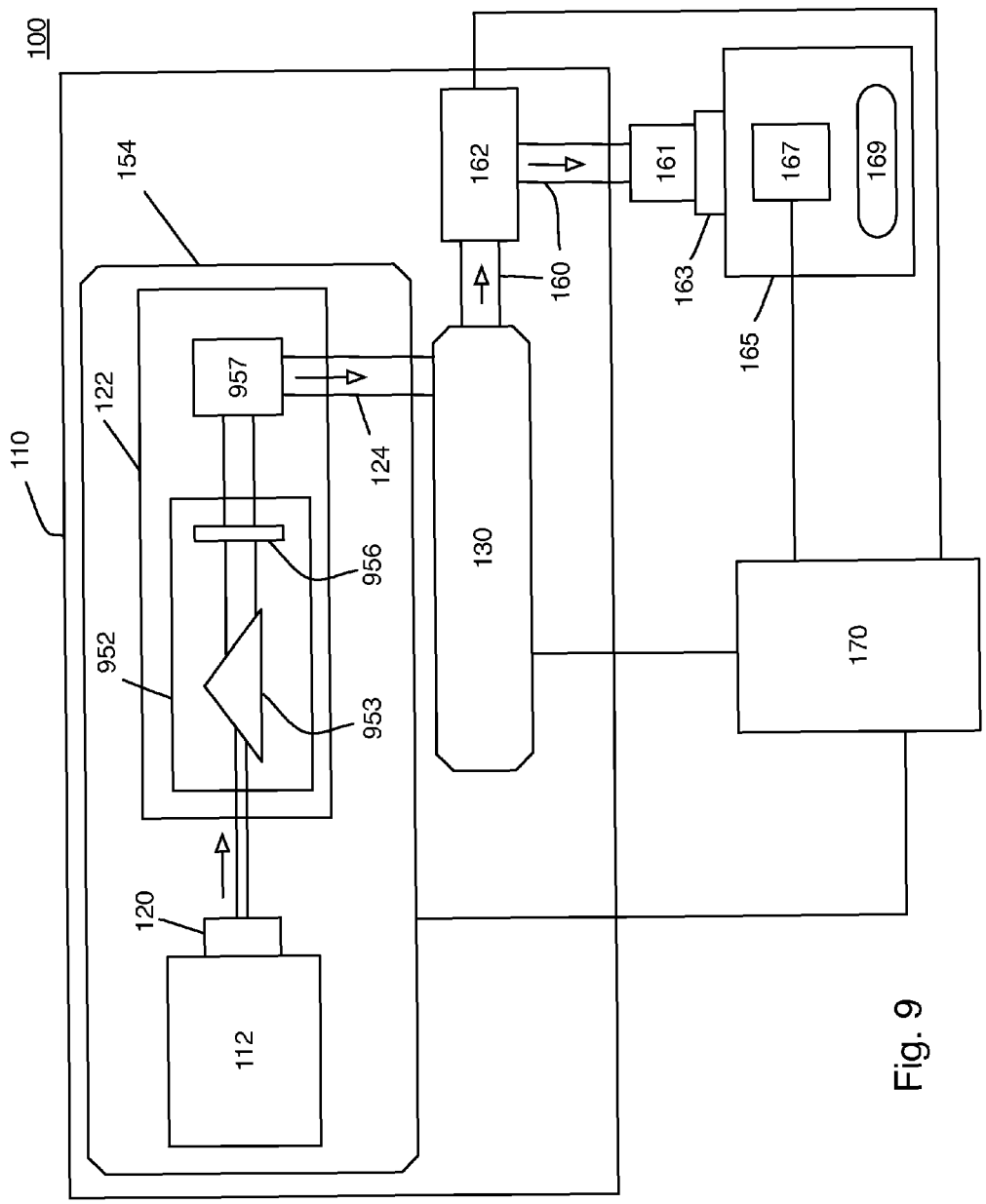

As another example, as shown in FIG. 9, the divergence control device 152 can include an image-rotating optical system 952, which, in this case is a dove prism, and a half-wave retarder 956 to rotate the beam by 90 degrees while maintaining proper orientation of the polarization with respect to the ring resonator of the power amplification system 130. In this way, the divergence of the output light beam 160 is reduced by swapping the two divergences of the seed light beam 124. The two divergences of the seed light beam 124 are similarly defined as those of the output light beam 160; the normal divergence of the seed light beam 124 is taken along the perpendicular direction to the plane of the ring and the non-normal divergence of the seed light beam 124 is taken along a direction that is within the plan of the ring and also transverse to the optical axis of the seed light beam 124. It turns out that the normal divergence of the seed light beam 124 can be several times larger (for example, two-four times larger) than the non-normal divergence of the seed light beam 124. In one example, the normal divergence of the seed light beam 124 can be greater than 1 milliradian while the non-normal divergence of the seed light beam 124 can be less than 0.5 milliradian. The goal of the image-rotating optical system 952 is to swap these two divergences so that the smaller of the two is directed along the normal direction prior to injection into the power amplification system 130.

Even though the larger of the two would be directed along the plane of the ring in this scenario, it does not adversely impact the divergence $\theta_B$ of the output light beam 160 taken along the direction 405 in the plane of the ring and transverse to the optical axis 400 because the ring resonator has a smaller angular acceptance along the plane of the ring and does not sustain oscillation in such a large angular band. Note also that the free-running divergence $\theta_B$ along the direction 405 was naturally lower than the free-running divergence $\theta_A$ along the normal direction 410.

When running in injection mode in which the seed light beam 124 is injected into the power amplification system, and when using the image-rotating optical system 952 within the master oscillator system 154, the divergence $\theta_A$ of the output light beam 160 in the far field can be reduced by 50% of the value of the divergence $\theta_A$ of the output light beam 160 that is obtained without the image-rotating optical system 952.

The beam modification optical system 122 in this example can also include other optical components 957 such as reflective or refractive optical devices for controlling other aspects of the light beam. Moreover, another image-rotating optical system 952 that could be used is an out-of-plane periscope.

Referring to FIG. 10A, in another example, the divergence control device 152 can be within the line-narrowing module 116. As shown in FIG. 10B, the line-narrowing module 116 typically includes optical elements such as prisms 1001, 1002, 1003, 1004 and a diffractive element such as a grating 1006. One or more of these optical elements can be fixed to an actuator, which is connected to the control system 170. For example, the actuator can be a rotational motion device or stepper motor. The position and/or angle of one or more of the optical elements can be adjusted relative to the other optical elements of the module 116 to adjust a center wavelength (coarsely or finely or both) and/or a bandwidth of the seed light beam 124.

Referring to FIGS. 11A and 11B, the divergence control device 152 can be a modified version of one of the optical elements of the line-narrowing module 116. For example, the divergence control device 152 can be a prism 1152 selected from among the prisms 1001, 1002, 1003, or 1004, in which a cylindrical concave curvature is added to a surface 1153 of the prism 1152. The curvature is along the direction that is normal to the plane of the ring. The addition of such curvature can reduce the divergence of the seed light beam 124 along the direction that is normal to the plane of the ring by 25%, which causes a reduction in the divergence $\theta_A$ of the output light beam 160 along the normal 410 direction.

For example, as shown in FIG. 11B, the surface 1153 can have a radius of curvature of between about 10-50 meters. The size of the radius of curvature selected for the surface 1153 is selected to provide enough of a reduction in the divergence. The exemplary values noted herein can be determined based on one or more properties of the photolithography system 100. The depiction of the radius of curvature of the surface 1153 in FIG. 11B is exaggerated for clarity. While prism 1001 was selected to be modified with the curvature, it is possible that one of the other prisms 1002, 1003, 1004 could be modified instead.

Referring to FIG. 12A, in another implementation, the divergence control device 152 is a modified version of the output coupler 118 of the master oscillator 112. Specifically, as shown in FIGS. 12B and 13A-D, the output coupler 1252 has been modified to have a cylindrical convex curvature on a surface 1253 that faces the master oscillator 112 and thus faces the resonator that is formed between the output coupler 1252 and the line-narrowing module 116. The curvature is along the direction 210 that is normal to the plane of the ring. The addition of such curvature can reduce the divergence of the seed light beam 124 along the direction 210 that is normal to the plane of the ring by 25%, which causes a reduction in the divergence $\theta_A$ of the output light beam 160 along the normal 410 direction.

For example, as shown, the surface 1253 can have a radius of curvature of between about 10-50 meters. The size of the radius of curvature selected for the surface 1253 is selected to provide enough of a reduction in the divergence. The exemplary values noted herein can be determined based on one or more properties of the photolithography system 100. The depiction of the radius of curvature of the surface 1253 in the drawings is exaggerated for clarity.

The beam limiting apertures placed within the path of the seed light beam 124 can act to restrict light along the normal direction 210, and therefore a smaller range of angles of the rays of the seed light beam 124 are supported. Such beam limiting apertures can be at the output of the master oscillator, between the output coupler 118 and the power amplification system 130, or at other locations that are suitable. Optical rays of the seed light beam 124 that have divergences that are significantly greater than zero are rejected by such beam limiting apertures inside the cavity of the master oscillator 112. As a result, optical rays of the seed light beam 124 that are parallel with the optical axis of the seed light beam 124 have a longer cavity life and therefore a higher intensity. The increased angular selectivity of the laser cavity of the master oscillator 112 (due to the modifications within the line-narrowing module 116 or to the output coupler 118) leads to a reduced divergence of the seed light beam 124 in the normal direction 210.

The reduction in the divergence of the seed light beam 124 can be characterized by measuring the size (the beam profile) of the seed light beam 124 after it has been focused with a lens to an image plane. The measurement is performed in the image plane that represents the minimum spot size for the seed light beam 124 as determined by the focus of the lens.

In some implementations, the divergence control device 152 can transform (or swap) the direction of the divergences in the seed light beam 124 so that the divergences in the pulsed light beam 160 are thereby modified. Referring to FIG. 14, for example, the divergence of the seed light beam 124 taken along a first transverse direction can be swapped for the divergence of the seed light beam 124 taken along a second transverse direction (which is perpendicular to the first transverse direction) prior to injection into the power amplification system 130. Some ways in which this can be done include: modifying the relative geometrical arrangement of the master oscillator system 154 and the power amplification system 130; or placing one or more rotating optical elements 152 between the master oscillator system 154 and the power amplification system 130 that perform the transformation. The rotating optical elements can rotate the near field or rotate the polarization state (or perform both rotations).

The rotating optical element can include an image-rotating optical element that rotates the entire seed light beam 124 by 90° prior to injection into the power amplification system 130. Or, the rotating optical element can include a polarization rotating optical element. For example, as shown in FIGS. 15A and 15B, the image-rotating optical element is a dove prism 1552 inserted within the path of the seed light beam 124 as it travels from the master oscillator system 154 toward the power amplification system 130. The dove prism 1552 can be mounted at any angle $\theta_P$ relative to the first and second transverse directions of the light beam 124 to enable the degree of rotation $\theta_T$ needed for the transformation.

As another example, the image-rotating optical element is an out-of-plane periscope inserted within the path of the seed light beam 124 as it travels from the master oscillator system 154 toward the power amplification system 130.

Referring to FIG. 16, in another implementation, the divergence control device 152 is positioned within the power amplification system 130. In this example, the divergence control device 152 includes a rotating optical element within the regenerative ring amplifier and is configured to reduce a divergence of the output light beam 160 along a normal direction 210.

The rotating optical element can be an image-rotating optical element that rotates the entire beam by 90° on each round-trip through the ring. Or, the rotating optical element can be a polarization rotating optical element. The image-rotating optical element can be a dove prism or an out-of-plane periscope inserted within the power amplification system 130 between the optical coupler 234 and the beam turning optical element 150. Alternatively, the divergence control device 152 can be incorporated into the design of a component within the power amplification system 130. For example, the image-rotating optical element can be the beam turning optical element 150 or the arrangement of the beam turning optical element 150, the optical coupler 234, and the mirror 236 can be configured as an out-of-plane periscope.

Referring to FIG. 17, in some implementations, the image-rotating optical element is placed between the optical coupler 234 and the mirror 236. It might be advantageous to place the image-rotating optical element in a location within the ring at which the light beam is closest to a square shape so that after it is rotated by 90° it does not get clipped to blocked in other locations of the ring. For example, referring to FIG. 18A, in other implementations, the image-rotating optical element is placed between the prism 244 and the optical coupler 234. As another example, referring to FIG. 18B, in other implementations, the image-rotating optical element is placed between the mirror 236 and the prism 242.

Other implementations are within the scope of the following claims.

What is claimed is:

1. A deep ultraviolet light source comprising:
   a master oscillator producing a seed light beam;
   a regenerative ring amplifier receiving the seed light beam from the master oscillator and outputting an output light beam, the regenerative ring amplifier including a set of optical components that define a plane of a closed ring; and
   a divergence control device within the master oscillator or between the master oscillator and the regenerative ring amplifier and configured to reduce a divergence of the output light beam along a normal direction, the normal direction being perpendicular to the plane of the ring.

2. The light source of claim 1, wherein the divergence control device includes a normal direction beam expander between the master oscillator and the regenerative ring amplifier.

3. The light source of claim 1, wherein the master oscillator includes an output coupler through which the seed light beam exits the master oscillator, and the divergence control device includes the output coupler, which is an optical device that is convex in the normal direction.

4. The light source of claim 3, wherein the optical device is a cylindrical convex lens.

5. The light source of claim 1, wherein the optical device is an output coupler of the master oscillator, in which the output coupler has a convex reflecting surface.

6. The light source of claim 1, wherein the divergence control device includes an image-rotating optical element.

7. The light source of claim 6, wherein the image-rotating optical element is a dove prism or an out-of-plane periscope.

8. The light source of claim 1, wherein the divergence control device includes at least one optical element within a line-narrowing module of the master oscillator.

9. The light source of claim 8, wherein the at least one optical element within the line-narrowing module of the master oscillator is a refractive optical element having a curvature along the normal direction.

10. The light source of claim 9, wherein the refractive optical element has a concave curvature along the normal direction.

11. The light source of claim 1, wherein the divergence control device includes an optical device that is convex in the normal direction and a beam-limiting aperture arranged in the normal direction to limit the beam in the normal direction.

12. The light source of claim 1, wherein the divergence control device is between the master oscillator and the regenerative ring amplifier.

13. A method of controlling a divergence of an output light beam in a normal direction that is perpendicular to a plane of a ring of a regenerative ring amplifier, the method comprising:
   producing a seed light beam by supplying current to electrodes on sides of a gain medium of a master oscillator;
   supplying current to electrodes on sides of a gain medium of a regenerative ring power amplifier that includes a set of optical components that define a plane of the ring;
   directing the seed light beam through an input/output optical coupler of the regenerative ring power amplifier;
   outputting an output light beam from the regenerative ring amplifier through the input/output optical coupler; and
   reducing a divergence of the output light beam along a normal direction, the normal direction being perpendicular to the plane of the ring, by modifying the seed light beam prior to directing the seed light beam through the input/output coupler of the regenerative ring amplifier.

14. A method comprising:
   producing a seed light beam traveling along its own optical axis direction, and having a value for a spatial property taken along a first transverse direction that is defined in a plane perpendicular to its own optical axis direction and a value for the spatial property taken along a second transverse direction that is defined in the plane perpendicular to its own optical axis direction and is perpendicular to the first transverse direction;
   directing the seed light beam through a regenerative ring amplifier that includes a set of optical components that define an optical plane of the ring;
   outputting an output light beam from the regenerative ring amplifier, the output light beam traveling along its own optical axis direction, and having a value for the spatial property taken along a first transverse direction that is defined in a plane perpendicular to its own optical axis direction and a value for the spatial property taken along a second transverse direction that is defined in the plane perpendicular to its own optical axis direction and is perpendicular to the first transverse direction; and
   transforming the value of the spatial property in the first and second transverse directions of the seed light beam to thereby transform the value of the spatial property in the first and second transverse directions of the output light beam.

15. The method of claim 14, wherein transforming the value of the spatial property comprises rotating a beam profile of the seed light beam by 90 degrees.

16. The method of claim 14, wherein transforming the value of the spatial property comprises rotating a polarization of the seed light beam.

17. The method of claim 14, wherein transforming the value of the spatial property comprises rotating the beam profile of the seed light beam so that after the rotating optical element:
   the spatial property value taken along the first transverse direction becomes the spatial property value taken along the second transverse direction, and
   the spatial property value taken along the second transverse direction becomes the spatial property value taken along the first transverse direction.

18. The method of claim 14, wherein the spatial property comprises a divergence.

19. A deep ultraviolet light source comprising:
   a master oscillator producing a seed light beam traveling along its own optical axis direction, and having a value for a spatial property taken along a first transverse direction that is defined in a plane perpendicular to its optical axis direction and a value for the spatial property taken along a second transverse direction that is defined in the plane perpendicular to its optical axis direction and is perpendicular to the first transverse direction;
   a regenerative ring amplifier receiving the seed light beam from the master oscillator and outputting an output light beam, the regenerative ring amplifier including a set of optical components that define a plane of the ring, the output light beam traveling along its own optical axis direction, and having a value for the spatial property taken along a first transverse direction that is defined in a plane perpendicular to its optical axis direction and a value for the spatial property taken along a second transverse direction that is defined in the plane perpendicular to its optical axis direction and is perpendicular to the first transverse direction; and
   a rotational arrangement configured to transform the value of the spatial property in the first and second transverse directions of the seed light beam to thereby transform the value of the spatial property in the first and second transverse directions of the output light beam.

20. The light source of claim 19, wherein the rotational arrangement comprises an image-rotating optical element.

21. The light source of claim 19, wherein the rotational arrangement comprises a polarization rotating optical element.

22. The light source of claim 19, wherein the rotational arrangement comprises a rotating optical element that is configured to rotate the beam profile of the seed light beam so that after the rotating optical element:
   the spatial property value taken along the first transverse direction becomes the spatial property value taken along the second transverse direction, and
   the spatial property value taken along the second transverse direction becomes the spatial property value taken along the first transverse direction.

23. The light source of claim 19, wherein the spatial property comprises a divergence.

* * * * *